US006606916B2

(12) United States Patent
Bignell et al.

(10) Patent No.: US 6,606,916 B2
(45) Date of Patent: Aug. 19, 2003

(54) TIMED WINDOW ULTRASONIC GAS METER WITH NOSE CONE

(75) Inventors: Noel Bignell, Annandale (AU); Colin Walter Braathen, Turramurra (AU); Gerard Jan Jeep Berend DeGroot, Mount Colah (AU); Barry John Martin, Marsfield (AU); Charles Malcolm Welsh, Kariong (AU); John Graeme Winter, Earlwood (AU)

(73) Assignee: Commonwealth Scientific and Research Organisation, North Sydney NSW (AU)

( * ) Notice: Subject to any disclaimer, the term of this patent is extended or adjusted under 35 U.S.C. 154(b) by 139 days.

(21) Appl. No.: 09/747,579

(22) Filed: Dec. 22, 2000

(65) Prior Publication Data

US 2002/0011119 A1 Jan. 31, 2002

(30) Foreign Application Priority Data

Dec. 22, 1999 (AU) .............................. PQ4801

(51) Int. Cl.[7] ................................. G01F 1/66
(52) U.S. Cl. ..................... 73/861.27; 702/45
(58) Field of Search .................. 73/861.27, 861.28, 73/861.29; 702/45, 48, 47, 50, 55, 56, 66, 72, 103, 177, 178, 183, 189, 79

(56) References Cited

U.S. PATENT DOCUMENTS

| 3,282,101 | A | 11/1966 | Yamamoto |
| 4,022,058 | A | 5/1977 | Brown |
| 4,480,485 | A | 11/1984 | Bradshaw et al. |
| 5,123,286 | A | 6/1992 | Baumgartner |
| 5,163,331 | A | 11/1992 | Gill |
| 5,178,018 | A | 1/1993 | Gill |
| 5,553,505 | A | 9/1996 | Bignell et al. |

FOREIGN PATENT DOCUMENTS

| JP | 57-190.281 | 11/1992 |
| WO | WO 86/02722 | 5/1986 |
| WO | WO 88/02124 | 3/1988 |

*Primary Examiner*—Hezron Williams
*Assistant Examiner*—Corey D. Mack
(74) *Attorney, Agent, or Firm*—Wood, Phillips, Katz, Clark & Mortimer

(57) ABSTRACT

An ultrasonic fluid flow meter (50) measures the flow speed of a fluid by measuring the time, in each direction, for a sequence of ultrasonic pulses (55) to pass between two transducers (54A,54B) positioned in a measuring tube (52) in the fluid flow path. The second and subsequent transmit pulses of each sequence are caused to start by the arrival of its predecessor at the detector end of the measuring tube. A first transmit pulse calculates a delay (110) to a zero crossing which is used to identify a particular zero crossing at which the arrival of each pulse in the sequence is determined.

13 Claims, 23 Drawing Sheets

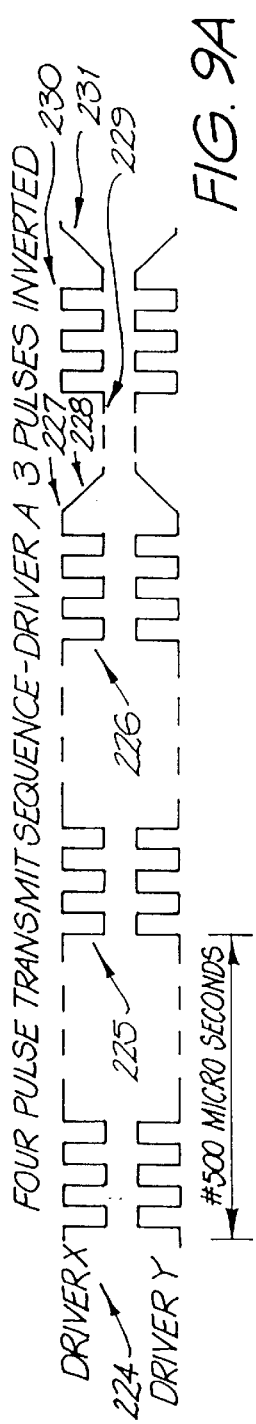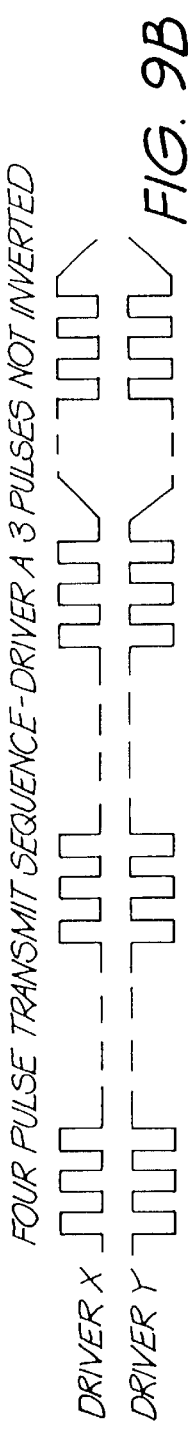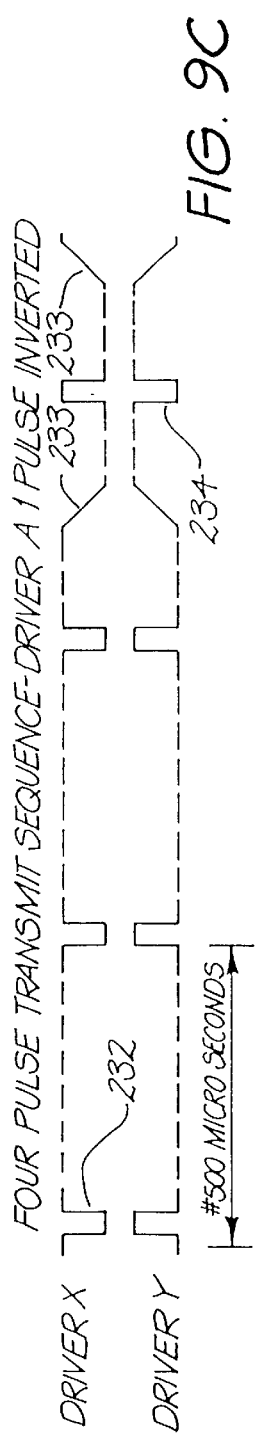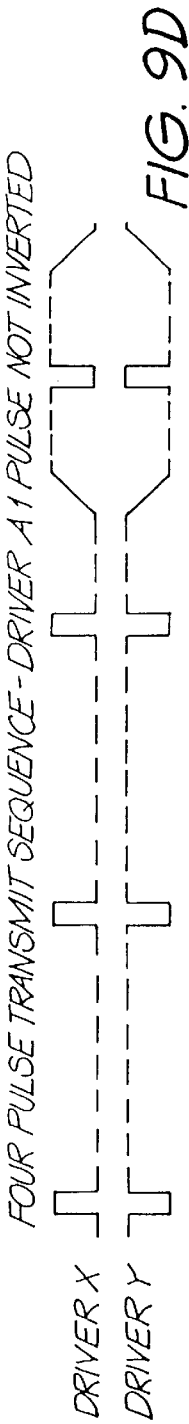

TIMED WINDOW ULTRASONIC GAS METER WITH NOSE CONE

FIELD OF THE INVENTION

The present invention relates to fluid flow meters and, in particular, discloses an ultrasonic fluid flow meter which provides accurate timed reception of an ultrasonic pulse.

BACKGROUND

Ultrasonic fluid meters are used for the measurement of fluid flow parameters, typically of fluids such as hydrocarbon gas and/or petroleum. Recent developments in this technological field have indicated that in order to obtain high levels of accuracy, a number of the aspects of operation of an ultrasonic flow meter must be optimised. For example, the ring-around (or sing-around) technique of transmission of ultrasonic pulses is known to provide an accurate fluid flow measurement obtained through averaging propagation times. From such an average, fluid flow parameters can be readily calculated. However, when using this ring-around technique, the detection of the time of receipt of the ultrasonic signal is critical and becomes difficult due to the complex interaction of high order acoustic modes which propagate together with a plane wave (or fundamental) mode in the measuring tube. Notably, certain high order acoustic modes typically travel at speeds close to integral fractions of the plane wave mode to the extent that high order modes from one acoustic wave packet interfere with the plane wave modes of a number of following acoustic wave packets in the ring-around sequence.

There have been proposed methods of detecting the arrival of the acoustic wave packet based upon an assessment of the amplitude of the received acoustic wave packet and identifying a specific reference (eg. zero) level crossing of the wave packet which can be used to trigger the transmission of the next wave packet in the ring-around sequence. However, the present inventors have determined that the use of amplitude techniques alone is insufficient to provide for sufficiently accurate detection of the acoustic wave packet. This is because the received amplitude can be often corrupted by noise and high order acoustic modes which can cause errors that are unacceptable at the desired levels of precision.

It is an object of the present invention to address these problems of detection of an ultrasonic acoustic wave in a fluid flow meter.

SUMMARY OF THE INVENTION

In accordance with one aspect of the present invention there is disclosed a method of detecting the arrival at a transducer of an acoustic wave packet within a series of acoustic wave packets, said method comprising the steps of:
 (a) determining a nominal time of propagation of a single acoustic wave packet by:
  (i) simultaneously starting a timer and transmitting said single acoustic wave packet to said transducer;
  (ii) receiving said single acoustic wave packet at said transducer; and
  (iii) identifying a predetermined part of said wave packet and stopping said timer to thereby determine said nominal time of propagation;
 (b) transmitting said series of acoustic wave packets to said transducer wherein the transmission of any one wave packet within said series, excepting a first wave packet, is initiated upon detection of arrival at said transducer of an immediately preceding wave packet in said series;
 (c) upon each transmission of said wave packet in step (b) starting a timer; and
 (d) determining when said timer is within a predetermined time of said nominal time of propagation to then enable identification at said transducer of said predetermined part of the corresponding wave packet to thereby detect the arrival of said corresponding wave packet.

In accordance with a another aspect of the present invention there is disclosed a method of detecting the arrival at a transducer of an acoustic wave packet within a series of acoustic wave packets, where the transmission of any one wave packet in said series, excepting a first wave packet, is initiated upon detection of arrival at said transducer of an immediately preceding wave packet in said series, and the detection involves identifying a particular part of a waveform received at said transducer after arming a receiving arrangement that detection is imminent, characterised in that said method includes, prior to transmission of said series, transmitting a single acoustic wave packet to said transducer and determining a nominal propagation time of said single wave packet by identifying a corresponding particular part of a corresponding waveform received without arming said receiving arrangement, whereby said nominal propagation time is used to arm said receiving arrangement for the detection of each said wave packet within said series.

In accordance with another aspect of the present invention there is disclosed an electronic fluid meter comprising:
 a duct through which a fluid may flow;
 at least two acoustic transducers arranged within said duct to transmit acoustic energy therebetween, said transducers being separated by a predetermined distance defining a measurement portion therebetween;
 a control system for causing transmission and monitoring reception of acoustic wave packets between said transducers, said control system including:
 first means for determining a nominal time of propagation of a single acoustic wave packet, said first means including:
  (i) second means for simultaneously starting a timer and transmitting said single acoustic wave packet to said transducer;
  (ii) third means for receiving said single acoustic wave packet at said transducer; and
  (iii) fourth means for identifying a predetermined part of said wave packet and stopping said timer to thereby determine said nominal time of propagation;
 fifth means for transmitting said series of acoustic wave packets to said transducer wherein the transmission of any one wave packet within said series, excepting a first wave packet, is initiated upon detection of arrival of an immediately preceding wave packet in said series;
 sixth means for, upon each transmission of said wave packet, starting a timer; and
 seventh means for determining when said timer is within a predetermined time of said nominal time of propagation to then enable identification of said predetermined part of the corresponding wave packet to thereby detect the arrival of said corresponding wave packet.

In accordance with another aspect of the present invention there is disclosed a method of measuring a fluid flow parameter, said method comprising the steps of:
 transmitting an ultrasonic test pulse from a first location within a fluid flow path, receiving said ultrasonic test pulse at a second location within the fluid flow path to determine a time delay value between a start of transmission of said test pulse and an active zero crossing of said received ultrasonic test pulse, thereafter transmitting from said first location, a plurality of successive ultrasonic measurement pulses which are received at said second location by crossing a zero reference value after expiration of said time delay value being started simultaneously with transmission of each of said successive ultrasonic measurement pulses.

BRIEF DESCRIPTION OF THE DRAWINGS

A number of embodiments of the present invention will now be described with reference to the drawings in which:

FIGS. 9A to 9D show transducer firing sequences used in some embodiments;

DETAILED DESCRIPTION

Figure 1:
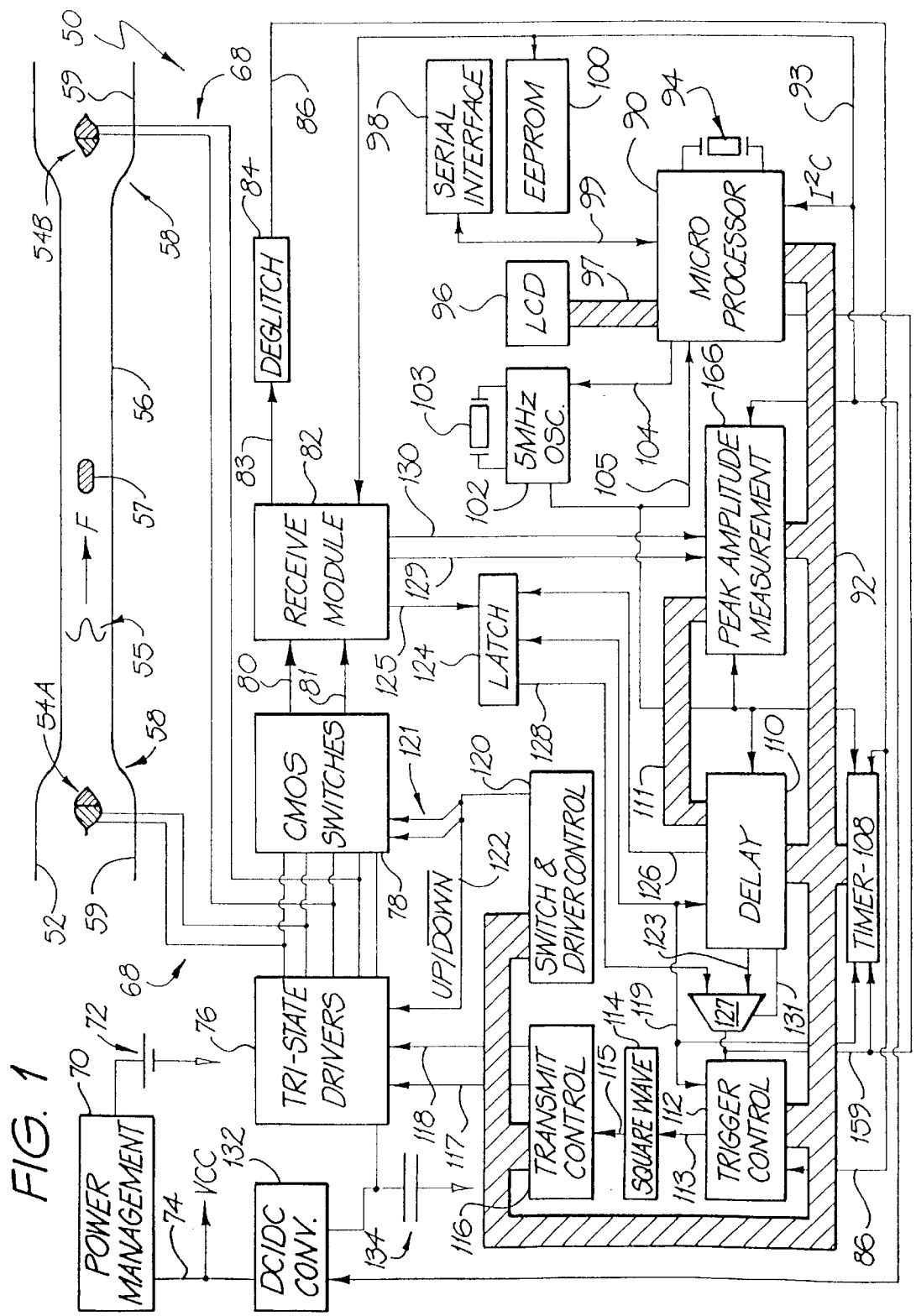
FIG. 1 is a schematic block diagram representation of the preferred embodiment.

Disclosed is an arrangement which measures the flow speed of a fluid by measuring the time, in each direction, for a sequence of ultrasonic pulses to pass between two transducers positioned in a measuring tube in the fluid. The second and subsequent transmit pulses of each sequence are caused to start by the arrival of its predecessor at the detector end of the measuring tube. The time is measured first for pulses going in the upstream direction then for pulses going in the downstream direction, or vice versa. The two transducers are alternately used as transmitter and receiver. This represents a typical "ring-around" sequence.

Changes in the sonic velocity caused by differing gas density and temperature coupled with the effects of flow, can change the transit time of an ultrasonic pulse by a time greater than the duration of a period of the received waveform. The measurement of gas flow in one direction however can be completed in a ring-around sequence in times as short as 50 milliseconds. For such short times, gas density, temperature and flow can be treated as constant. This means that, if it is determined immediately before the measurement, the time period to receive a specific cycle of the transmitted signal will be valid for the duration of the measurement.

Thus, in the preferred embodiment, the delay to a zero crossing of the received signal is determined using a single transmit/receive before a measurement (ring-around) sequence. This time, though not as accurate as that obtained from the measurement sequence itself, is sufficiently accurate to allow a delay to be calculated which will uniquely identify a particular zero crossing in the received signal. The preferred embodiment sets its receive electronics to respond to either a positive going or a negative going crossing, described herein as active zero crossings. A single ultrasonic pulse is therefore transmitted and a high speed timing counter synchronously started. The high speed timing counter is stopped on the first active zero crossing of the received signal after the received signal has exceeded a preselected amplitude. The time in the high frequency timing counter represents the time from the transmit start to this zero crossing. The result of the single transmit measurement is used to calculate a delay. The delay calculated is the time from the start of a transmit to before the zero crossing on which a retransmit is desired, but after the preceding active zero crossings.

At the start of a measurement using N ring-around sequences the following operations are carried out. The delay timer is started and then, synchronously, an ultrasonic pulse is transmitted, the high speed timing counter is started, and the delay timer is initialised. The start of subsequent ultrasonic bursts and initialisation of the delay counter is triggered by a crossing of the zero signal level by the received signal following the time-out of the delay timer. The last receive signal of a ring-around also has its detection electronics enabled by the delay counter, but instead of initiating a retransmit pulse, the received signal zero crossing stops the high speed timing counter. The value in the high speed timing counter thus represents the total time of flight of the N acoustic signals within the fluid so that the transit time of an ultrasonic pulse is 1/N of this measured time.

FIG. 1 shows an ultrasonic gas meter 50 which includes a conduit 52 having a circular transverse cross-section through which a flow F of gas passes. Arranged in the conduit 52 are a pair of ultrasonic transducer modules 54A and 54B spaced apart by a predetermined distance defining a measurement portion 56 therebetween. The measurement portion 56 provides a straight line/direct channel between the transducer modules 54A and 54B thus providing a direct path for the propagation of an ultrasonic acoustic wave packet 55 between the transducer modules 54A and 54B and thus ameliorating the likelihood of multipath propagation. Located within the measurement portion 56 is a mode control device 57 aerodynamically configured and positioned so as to control the propagation of acoustic modes to thereby reduce their contribution upon a signal received by either one of the transducers 54A and 54B. Further, as seen from FIG. 1, the conduit 52 includes end portions 59 of greater cross-sectional area coupled to either side of the measurement portion 56 by transitions 58 which, when combined with an aerodynamic shape of the transducer modules 54A and 54B and the device 57, minimise pressure drop in the measurement portion 56 and assist pressure recovery as the fluid exits the measurement portion 56. The measurement portion 56 is formed within the conduit 52 is typically of a cylindrical geometry, however other geometries may be used.

Figure 2A:
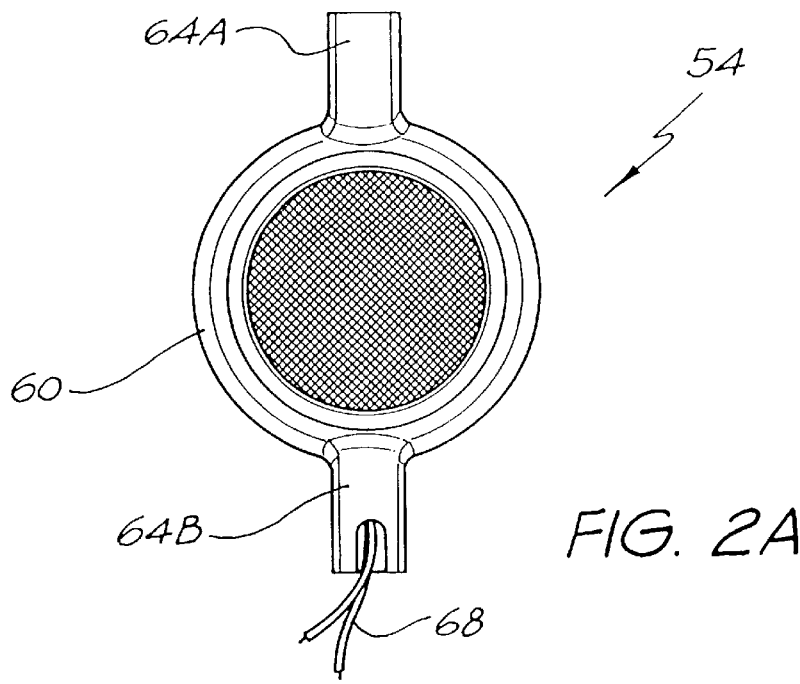
FIGS. 2A and 2B illustrate the ultrasonic transducer and transducer housing used in the preferred embodiment.
Figure 2B:
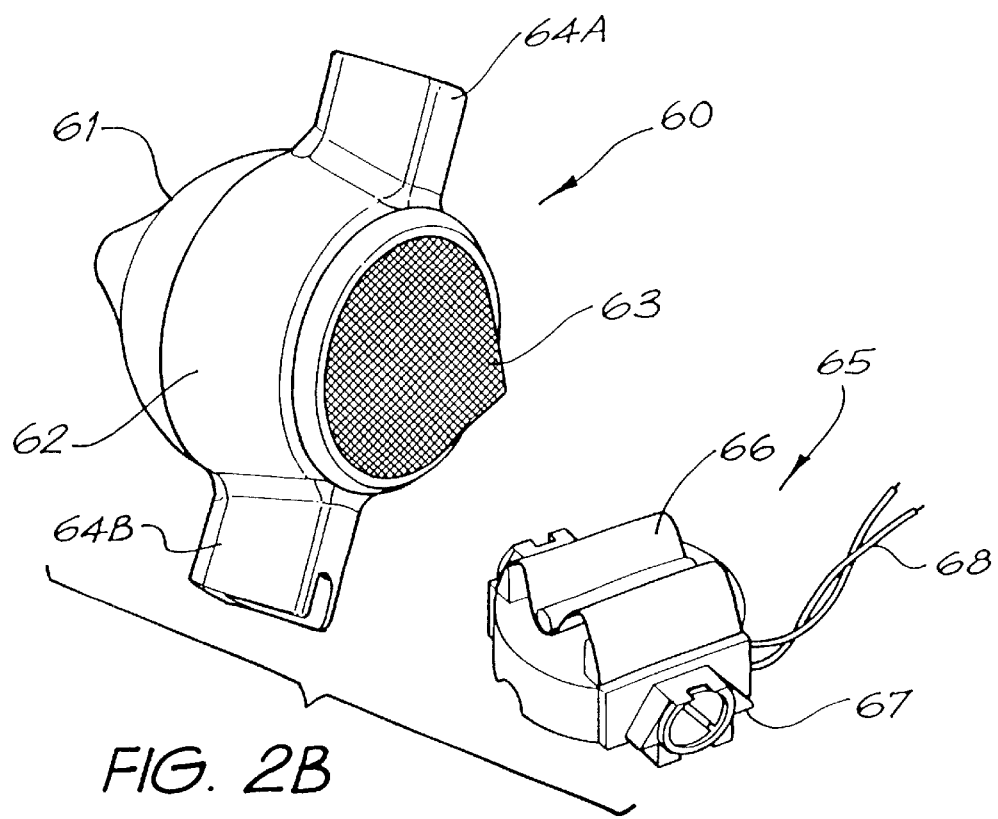

FIGS. 2A and 2B illustrate a typical transducer module 54 used to implement the transducer module 54A and 54B. The module 54 is formed of a three-part transducer housing 60 and an ultrasonic transducer assembly 65. The ultrasonic transducer assembly 65 is formed of a gold coated PVDF foil 66 flexed into a saddle or m-shaped configuration and supported by a mounting block 67 and to which a pair of transducer lines 68 connect. Gold is preferred as the foil coating as other materials tend to oxidize over time, thus introducing poor contact with the transducer connecting leads 68 which can cause non-linearities in the electro-acoustic response of the transducer assembly 65. The transducer housing 60 includes three parts, those being an aerodynamically-shaped (teardrop) rear cover 61, a body mount 62 from which upper and lower supporting posts 64 extend, and a nose cone 63. As seen in FIG. 2A, the transducer lines 68 are configured to exit the housing 60 via a lower post 64B, the post 64B and an upper post 64A being provided for coupling the module 54 within the conduit 52 to thereby permit the leads 68 to connect to the remainder of the gas meter 50. The nose cone 63 is provided to achieve a number of effects. Firstly, the nose cone 63 includes perforations to permit the transmission of an acoustic wave from the transducer assembly 65 contained within the housing 60. The nose cone 63 is also provided to provide mechanical protection to the transducer foil 66 from particles which may be carried in the fluid, such as dust and the like typically carried by gaseous fluids. The nose cone 63 also protects the transducer foil 66 from pressure gradients and fluctuations caused by the fluid flow. The nose cone 63 also improves the aerodynamic characteristics of the module 54. Such nose cones and the like are well known in the art and have been used for many years in the taking of acoustic measurements within ducts and the like. Examples of such nose cones and other acoustic transducer covers have been described in the Brüel & Kjaer Electronic Instruments Catalogue 1971.

Returning to FIG. 1, the transducers 54A and 54B are coupled via the respective lines 68 to an interconnection between a tri-state driver module 76 and an array of CMOS switches 78. The tri-state driver module 76 is implemented such that two pairs of tri-state drivers drive each of the transducer modules 54A and 54B with a bipolar signal when a pulse is being transmitted. Similarly, utilising the CMOS switches 78, on reception a bipolar signal is received and communicated via lines 80 and 81 to a receive module 82. The transducer (eg. 54A) which is intended to transmit the ultrasonic signal along the measurement portion 56, has the switches 78 connecting it to the receive module 82 opened and the driver pair 76 connected to it enabled. The receiving transducer (eg. 54B) has the switches 78 connecting it to the receive module 82 closed ie. it is connected to the receive module 82. The driver pair 76 connected to the receiving transducer are placed in a high impedance state allowing the respective transducer connected to it to act as a receiver. The two outputs of the driven driver pair are driven in anti-phase such that when one goes high, the other goes low. This effectively applies twice the drive signal to the driven transducer.

Connected in parallel with the drivers are two pairs of tri-state current drivers used for slowly changing the polarity of the transducer modules. When a polarity change is required during a measurement sequence the tri-state drivers are tri-stated and the tri-state current drivers enabled. The drive signals to the drivers are changed and the current drivers supply a constant current until the transducer module has completed a slow bipolar change to the opposite polarity. The tri-state drivers are then enabled using the new drive polarity and then the current drivers are disabled. The tri-state current drivers are tri-stated when not in use. This is described later with reference to FIGS. 19 and 20.

Control of the tri-state driver 76 and CMOS switches 78 is achieved via a switch and driver control unit 120 which outputs control signals 121 to the CMOS switches 78 and up/$\overline{\text{down}}$ signals 122 to the tri-state drivers indicating whether or not the signal should transmit either up or down the measurement portion 56. The actual direction of transmission is controlled via a controlling microprocessor 90 of the gas meter 50 which is coupled to the switch and driver control unit 120 via a microprocessor bus 92.

Also coupled to the bus 92 is a transmit control unit 116 which provides anti-phase drive signals 117 and 118 to tri-state drivers 76. The transmit control unit 116 is provided with a monostable input signal 115 derived from a square wave generator 114. In the preferred embodiment, the square wave generator 114 outputs a series of gated pulses at 50% duty cycle and at a preferred frequency range of 100–140 kHz. The operation of the square wave generator 114 is enabled by a trigger control unit 112 and an enabling signal 113. The trigger control unit 112 is coupled to the microprocessor bus 92 and so may be enabled for transmission directly from the microprocessor 90 or alternatively upon receipt of a receive signal via a signal line 86 after being activated by signal 159 to cause a ring-around sequence.

Figure 3:
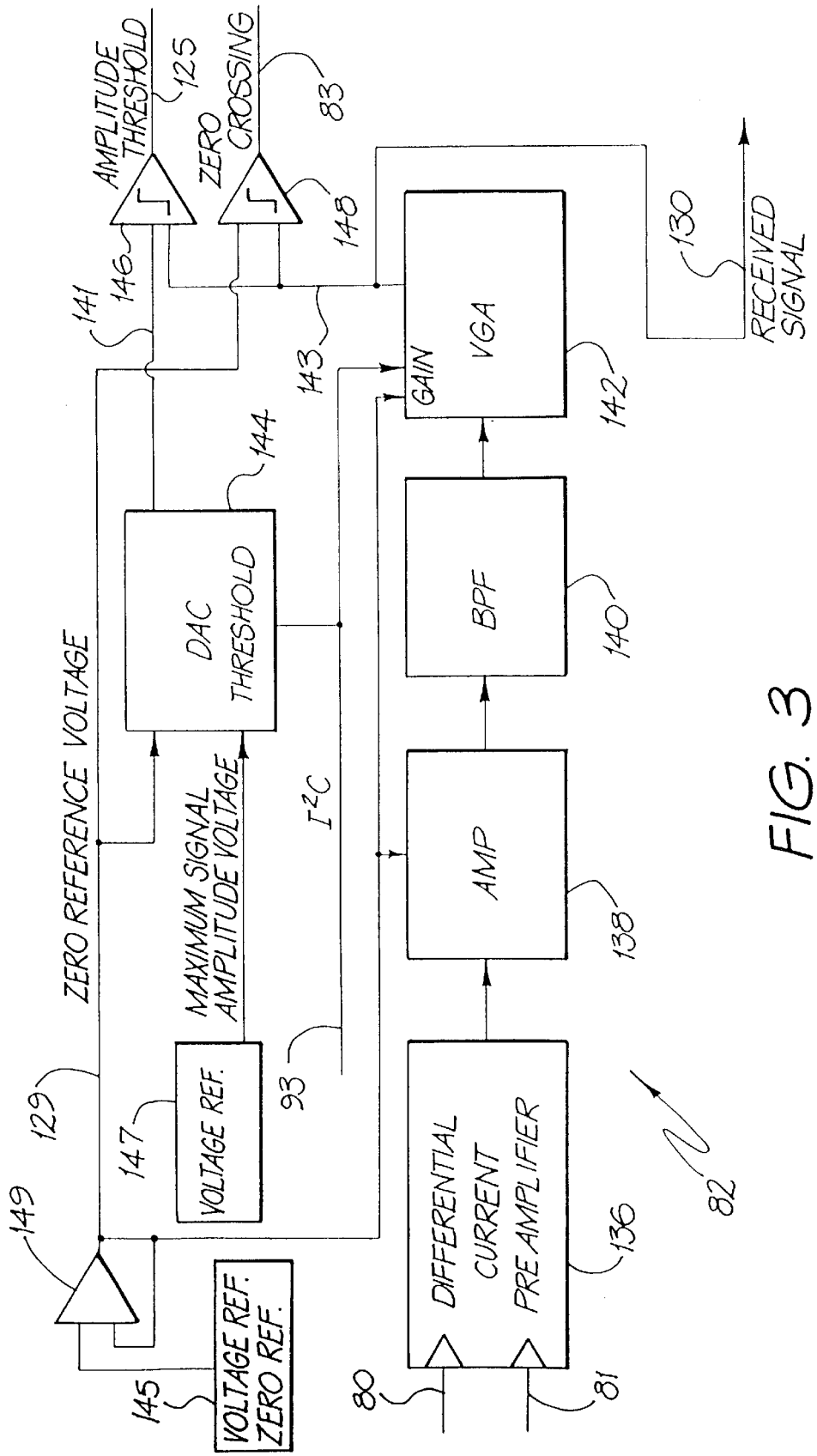
FIG. 3 schematically illustrates the receive module of FIG. 1.

A signal received by the receiving transducer (eg. 54B) is coupled via the CMOS switches 78 to a receive module 82. As seen in FIG. 3, the receive module 82 includes a differential current preamplifier 136 connected to the input lines 80 and 81 and which outputs a single ended signal to an amplifier 138 which in turn passes an amplified signal to a bandpass filter (BPF) 140. The bandpass filter 140 is preferably of a two-pole construction including a pass band of 60–180 kHz. The bandpass filter 140 outputs to variable gain amplifier (VGA) 142 which receives a gain control signal via an I$^2$C bus 93 which connects a number of components in the gas meter 50 and is controlled via the microprocessor 90. The VGA 142 outputs a received signal 130 which is used in a peak amplitude measurement circuit 166 to be described. The received signal 130 is also input 143 to a pair of comparators 146 and 148. The comparator 148 compares the receive signal against a zero reference voltage 129 to provide a zero crossing output 83. The zero reference voltage 129 is derived from a zero voltage reference source 145 which may be obtained through a resistive division of a supply voltage Vcc 74 of the gas meter 50 or alternatively by a long term low pass filtered average of the received ultrasonic signal, for example as output from the differential current preamplifier 136. The zero reference voltage 129 is also input to the VGA 142 to act as a zero reference for the amplification of the received signal.

The comparator 146 compares the signal 143 with the output of a digital-to-analog converter (DAC) 144 to provide an amplitude threshold signal 125. The DAC 144 is input with the zero reference voltage 129 and a voltage reference 147 comprising the maximum signal amplitude voltage that can be received by the receive module 82. The DAC 144 is also connected to the I$^2$C bus 93 which provides a threshold value 141 determined by the microprocessor 90 and with which the signal 143 is compared to provide the amplitude threshold signal 125.

As seen in FIG. 1, the zero crossing output 83 is supplied to a deglitch circuit 84 which removes any spurious transitions on the zero crossing signal and which outputs a signal 86 that is coupled to the trigger control unit 112 as described above, as well as a high speed timing unit 108. The timing unit 108 is seen in detail in FIG. 4 and effectively provides a 24 bit timing arrangement which is used to time the propagation of an acoustic wave packet between the transducer modules 54A and 54B.

Figure 4:
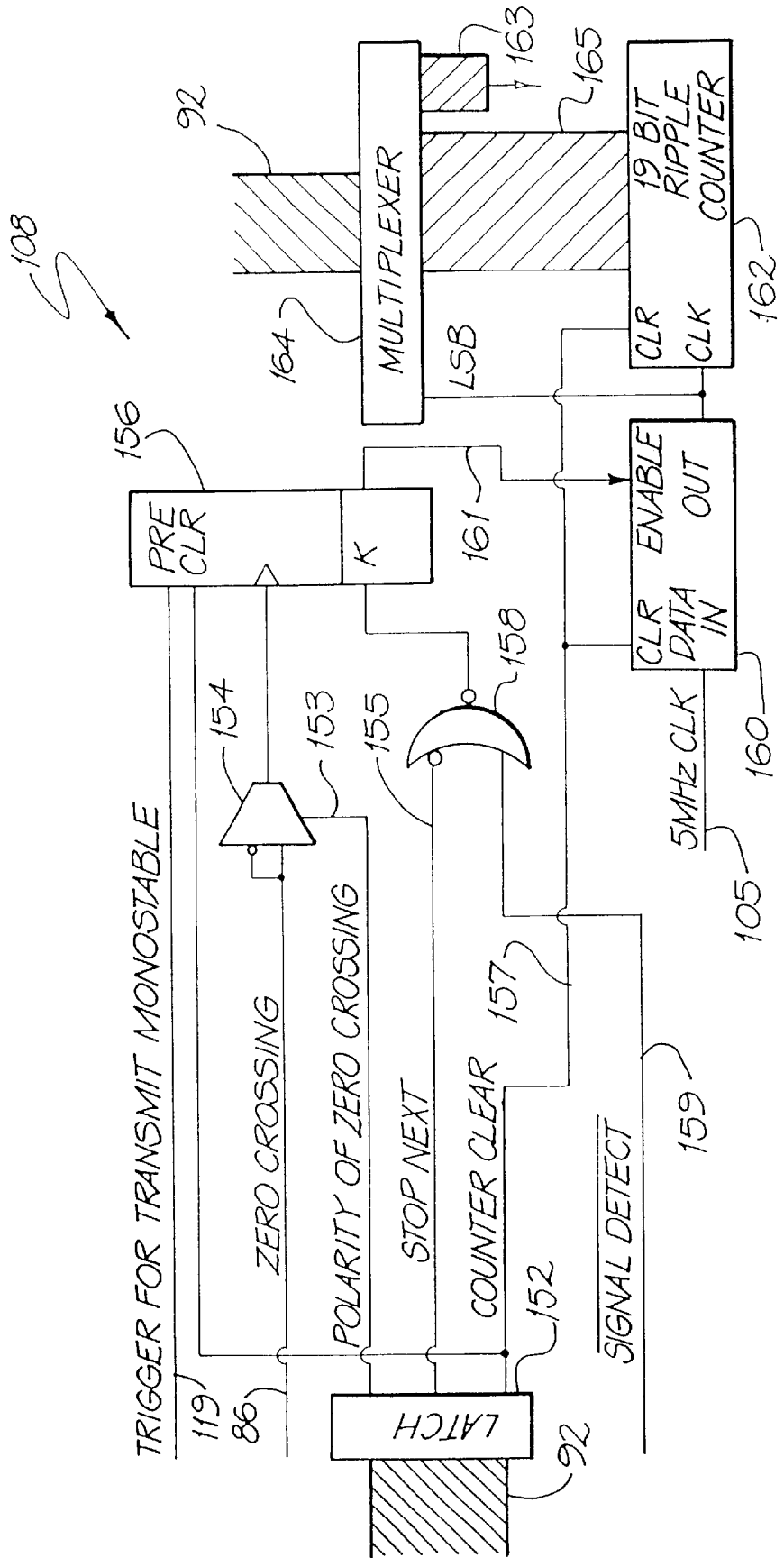
FIG. 4 is a schematic block circuit representation of the high speed timing module of FIG. 1.

As seen in FIG. 4, the timing unit 108 is provided with a number of control signals sourced from the microprocessor bus 92 and held by latch 152. The deglitched zero crossing signal, signal 86 is input via a multiplexer 154 to the clock input of latch 156. The microprocessor 92 sets the multiplexer control signal, signal 153 to select either the inverting or non-inverting input of multiplexer 154. If the non-inverting input is selected then positive received signal zero crossings cause latch 156 to receive positive going clock transmissions. If the inverting input is selected then negative going received signal zero crossings cause latch 156 to receive positive going clock transitions. A clearing signal 157 from the latch 152 acts to clear the latch 156, a latch 160 and a 19-bit ripple counter 162. The signal 157, clears the counter and inhibits clocking of the 19-bit ripple counter 162.

The latch 156 that controls the counter 162 is configured so that it can only be preset when its clear input is low and clocked low when its K input is high.

The timer unit 108 is started by trigger signal 119 presetting the latch 156. When trigger signal 119 presets the latch 156 it also triggers the square wave generator 113 which is the initiation of a transmit. When preset, latch 156 outputs signal 161 to latch 160 which is enabled to communicate a 5 MHz clock signal 105 to clock a 19-bit ripple counter 162. Additional transitions of trigger signal 119 have no effect on the timer unit 108 if the counter 162 is running. The start of the timing unit 108 and the first transmit are synchronised because the signal 119 derived from the trigger control unit 112 that starts the timing unit 108 also triggers the square wave generator 113.

The timing unit 108 is also provided with a number of control signals sourced from the microprocessor bus 92 and held by a latch 152. In addition to the polarity signal 153 described above, a "stop next" signal 155 is combined in a gate 158 with a signal detect value 159 from a multiplexer 127 and the output of which provides a K-input of the latch 156. Accordingly, by the microprocessor 90 enabling the "stop next" signal 155, the receipt of the first zero crossing 86 after the K input of the latch 156 has gone high, clocks the latch 156 low. The signal 161 output by the latch 156 to the latch 160 then disables the communication of the 5 MHz clock signal 105 and clocking of the 19-bit ripple counter 162 is stopped. The least significant bit of the count is the output of the latch 160.

As seen in FIG. 4, the ripple counter 162 has an output 165 coupled to a multiplexer 164 which connects to the microprocessor bus 92. The multiplexer 164 is of a 24-bit configuration having its least significant bit (LSB) connected to the output of the latch 160 and the four most significant bits (MSB's) 163 coupled to a logical "zero". In this fashion, the combination of the multiplexer 164 and the ripple counter 164 and latch 160 provide for a 24-bit count value to be provided to the microprocessor 90 and having a resolution equivalent to that which would be obtained had a 10 MHz clock signal been used. Thus, the arrangement illustrated provides for power savings through the ability to effectively double the resolution of the high speed clock 105 whilst avoiding the additional power consumption associated with higher clock speeds.

On completion of a propagation along the measurement portion 56, the microprocessor 90 may then interrogate the contents of the multiplexer 164 to identify the relative time (in clock cycles) taken for the acoustic wave packet to travel between the transducers 54A and 54B which can be used for the determination of gas flow measurement in the manner to be described. A clearing signal 157 from the latch 152 acts to clear each of the latches 156 and 160 and the counter 162.

The gas meter 50 is powered via a power management unit 70 whose power source typically comprises a single 3.5 volt D-sized lithium battery cell 72. The output of the power management unit 70 provides the voltage supply rail VCC 74 used to power most of the electronic components of the gas meter 50 and which provides for a timed-awakening of the electronics at periodic intervals to take and log flow measurements. The supply rail 74 also connects to a DC-to-DC converter 132 which acts to increase the voltage of the supply rail for the supply of the tri-state drivers 76 and the CMOS switches 78. Coupled between the DC-to-DC converter 132 and the drivers 76 and the CMOS switches 78 is a capacitor 134 which is charged during operation of the DC-to-DC converter 132 and which can store sufficient charge for at least a single transmission via the tri-state drivers 76. In this manner, via a connection of the DC-to-DC converter 132 to the bus 93, the converter 132 can be enabled by the microprocessor 90 to charge the capacitor 134 and then disabled before the time of reception. When this occurs the tri-state drivers are powered by stored energy in the capacitor 134. In order to avoid excessive noise being communicated in the circuitry of the gas meter 50, and in particular being detected by the receive module 82, the DC-to-DC converter 132 is enabled to recharge the capacitor 134 during the propagation of the acoustic wave packet along the measurement portion 56 so that the capacitor 134 can be fully charged and the converter 132 disabled prior to the reception of the acoustic wave packet, at which time the zero crossing signal 86 may actuate a further transmission inherent in a ring-around sequence.

The meter 50 is also provided with a serial interface 98 that is coupled to the microprocessor 90 via a connection 99 and enables the gas meter 50 to communicate with external devices via either an optical, radio frequency or some alternative communications link such as Mbus or like apparatus. An electronically erasable programmable read-only memory ($E^2PROM$) 100 coupled to the bus 93 is provided and includes calibration information associated with the particular gas meter 50. Further, a liquid crystal display 90 connects to the microprocessor 96 via a display bus 97 to enable display of measured flow and/or control values.

Typically, the microprocessor 90 comprises a 16 bit architecture with 16 kilobytes of read-only memory (ROM), 256 bytes of internal random access memory (RAM) and a universal asynchronous receiver transmitter (UART) which provides for communications with a serial interface 98. The microprocessor 90 is preferably implemented by a device which also includes an analog-to-digital converter with a current source, a timer with an interrupt useable as an event counter, a watchdog timer crystal timer, and a oscillator which is a time-of-day device providing a 32.768 kHz signal via a crystal 94 of corresponding resonant frequency. The latter is used as a real-time clock and, when its frequency is multiplied, is used as a clock for the microprocessor 90.

The gas meter 50 also includes an oscillator 102 which provides for the 5 MHz high speed clock signal used at a number of locations throughout the gas meter 50. As seen, the oscillator 102 is coupled to a crystal 103, which in the preferred embodiment has a resonant frequency of 4.9152 MHz. An on/off signal 104 is derived from the microprocessor 90 that facilitates the disabling of the 5 MHz clock signal during times when it is not required (eg. between ring-around sequences).

With reference to FIG. 1, one simple embodiment of the principle of operation of the present method may be described. The two ultrasonic transducers, 54A and 54B, each of which can act either as a transmitter or as a receiver, are disposed facing each other along the axis of the cylindrical measurement chamber 56 through which the fluid F whose flow velocity v is to be measured is flowing.

The method derives a value for the fluid flow velocity from the measured times of flight of an ultrasonic signal with, and against the fluid flow, using the expression:

$$v=0.5L(1/T_d-1/T_u)$$

where v=velocity of fluid in the measurement tube 56

L=length of the tube 56 (between the transducers 54A and 54B)

$T_d$=time-of-flight of acoustic pulse downstream $T_u$=time-of-flight of acoustic pulse upstream In the preferred embodiment L=175 mm and with a fluid, with the speed of sound being about 330 ms$^{-1}$, a typical propagation time would be about 525 μs.

A quantisation error associated with the high speed timing unit 108 limits the accuracy which can be achieved by timing a single transmit pulse. For example, at an effective clock speed of 10 MHz and a typical flight time of 525 μs, the error will be about 0.02%. The ring-around technique is used to achieve the desired accuracy using a short measuring tube and a lower frequency clock oscillator 102. In this technique, the time taken by the ultrasonic pulse 55 to travel down the measuring tube 56 is effectively increased by sending a number of pulses 55 in sequence, with the start of each new pulse burst being triggered by the arrival of its predecessor at the detector end of the measuring tube. The generation, emission and detection of a single ultrasound burst will henceforth be referred to as a "ring-around".

A gas velocity measurement is carried out by sending a number of ultrasonic bursts or packets in sequence. A gas velocity measurement is typically taken using a 64 ring-around sequence. The sequence is timed as a whole, the timer being started at the beginning of the first transmit and stopped on a selected zero crossing of the last received signal at the detector end. Advantageously, the influence on the timing of non-fundamental acoustic mode is ameliorated by transmitting in the ring-around sequence, three acoustic wave packets of like phase followed by one of opposite phase. The sequence is repeated until the end of the ring-around sequence.

Two timers are used, the first being the high speed timing counter 108 to time the total amount of time for the ring-around sequence and the second, a delay timer 110 or "arming counter", is loaded at the start of each transmit, and is used to enhance reception and retransmit.

In the preferred embodiments, a single scan of the gas flow includes two sets of a predetermined number of ringarounds, first in one direction and then in the other. The delay timer 110 is configured to time out before (typically about half the period of a received signal or about 3.8 μs before) the zero crossing which is to be used to initiate a retransmit or stopping of the timing unit 108.

Timing out of the delay timer 110 enables either a re-transmission, or a stopping of the timing unit 108, occurring on the next zero crossing of a direction previously selected by software executed by the microprocessor 90. The value loaded in the delay timer 110 will be such that the timer will time out before the zero crossing which is to initiate the next transmission or halt of the main timer.

The accurate measurement of the time-of-flight is the central task in determining fluid velocity by the present method. An important part of this process is the identification of a particular part of the signal.

The first part of an ultrasonic pulse arriving at the receiver transducer cannot be detected with accuracy because of its small amplitude. The point chosen as a timing marker is the point at which one cycle of the wave crosses the zero-signal axis, a so-called zero crossing. The zero crossing chosen is one that occurs a known number of cycles of the received signal after the arrival of the acoustic wave packet.

The preferred embodiment provides a superior way of identifying the zero crossing used for timing by first determining a delay time appropriate to the selected zero crossing. Re-transmission or stopping of the timing counter occurs on the first zero crossing of the designated polarity after the delay time has elapsed starting from the transmit pulse. There are at least three ways that this may be done:

Option (1) The delay that will identify the desired zero crossing is calculated from the single transmit result. The calculated delay is stored in a latch. The counter is cleared at the start of each ringaround transmit and counts up. Either positive going or negative going received signal zero crossings are selected to be active. The delay counter is compared to the delay value stored in the latch. A (13 bit) digital comparator detects when they are equal and enables the electronics. The next active zero-crossing either initiates a retransmit or stops the timing counter. This is a relatively logically complex implementation.

Option (2) The delay that will identify the desired zero crossing is calculated from the single transmit result. The calculated delay is loaded into the delay counter at the start of each ring around transmit. Either positive going or negative going received signal zero crossings are selected to be active. The delay counter then counts down through 000000 0000000. Transition of the most significant bit from 0 to 1 enables the electronics. The next active zero-crossing either initiates a retransmit or stops the timing counter.

Option (3) The delay that will identify the desired zero crossing is calculated from the single transmit result. The delay counter is loaded with the 2's complement of the calculated delay at the start of each ring around transmit. Either positive going or negative going received signal zero crossings are selected to be active. The delay counter then counts up through 111111 1111111 (if 13 bits are used). Transition of the most significant bit from 1 to 0 enables the electronics. The next active zero-crossing either initiates a retransmit or stops the timing counter. This third option provides the most minimal logic design and corresponds to a 2's complement implementation of Option (2).

Figure 5A:
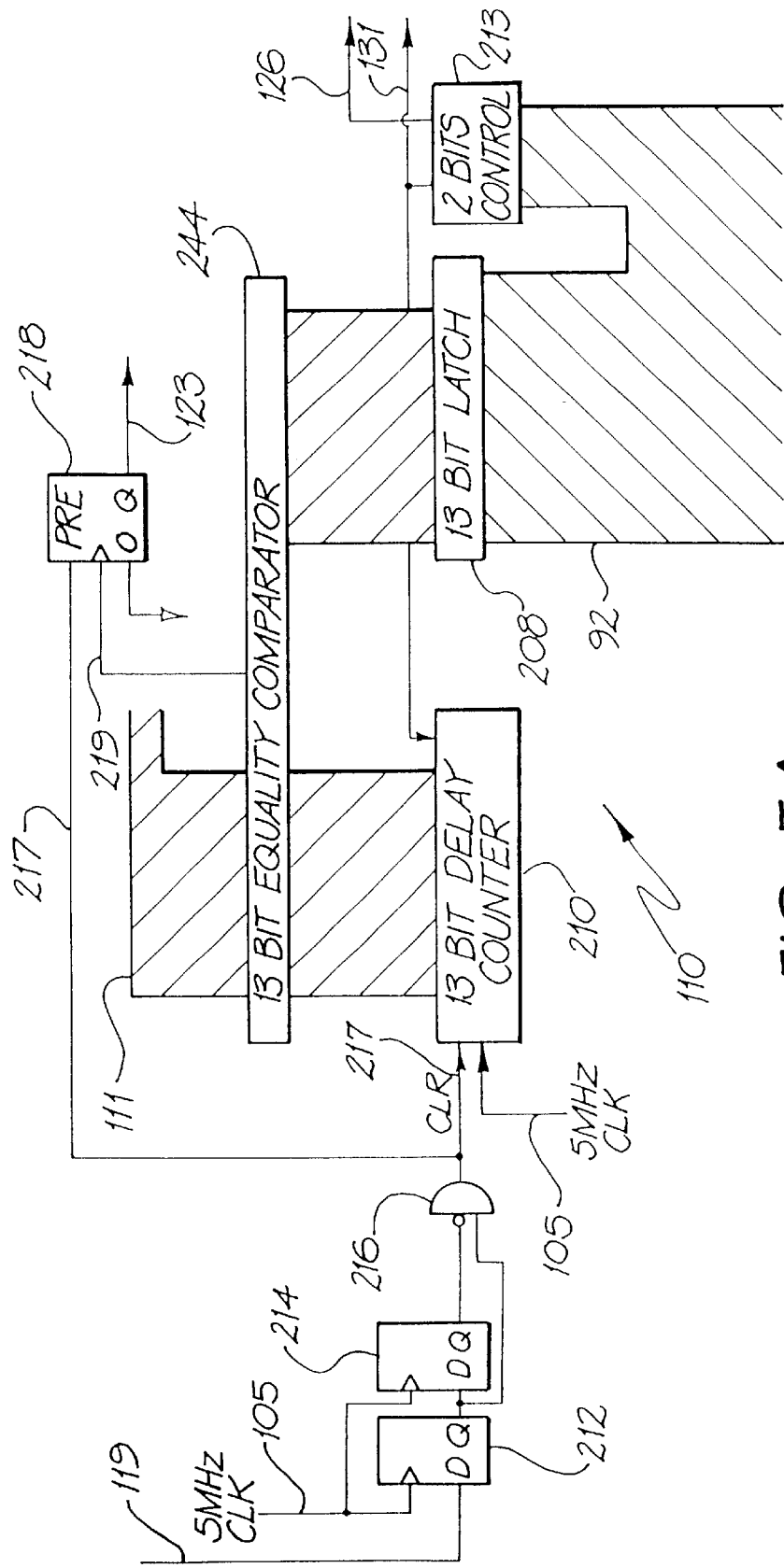
FIG. 5A is a schematic circuit representation of one embodiment of the delay timer of FIG. 1.

FIG. 5A shows the arrangement of a delay timer 110A, corresponding to the implementation of Option (1). The delay timer 110A includes a 13-bit latch 208 and a two-bit latch 213, which sources two control signals. Latch 208 and latch 213 are both coupled to the microprocessor bus 92. This provides for the loading of a predetermined delay time into latch 208 and control values into latch 213 to facilitate timing of the received signal.

The control signal 126 coming from the latch 213 is combined with the transmit trigger 119 via an OR gate (not illustrated) within a latch 124 (seen in FIG. 1) to provide for presetting the amplitude detect latch 124. The output of the amplitude-detect latch 124 forms signal 128. The amplitude comparator output 125 supplies a clock signal to latch 124. If latch 124 is held preset by signal 119 or signal 126 then signal 128 remains in the signal not detected state and is unaffected by the amplitude threshold comparator output, signal 125. If not held preset by signal 119 or signal 126 then the amplitude threshold comparator output 125 will clock latch 124 output, signal 128, to the signal detected state when a received signal is first detected.

Signal 131 high disables and clears the synchronous delay counter 210 and switches the multiplexer 126 so that the signal 128 coming from latch 124 forms the output of multiplexer 127, signal 159. Signal 159 goes to the trigger control 112, timer 108 and directly to the microprocessor 90. Signal 159 acts as a microprocessor "wake-up" interrupt and depending on control signals may pre-arm the trigger control unit 122 or the main timing counter 108 to respond to the next reception of a zero-crossing signal 86 of nominated polarity.

Signal 131 low enables the synchronous delay counter 210 and switches the multiplexer 127 so that delay output 123 forms the output of multiplexer 127, signal 159, going to the trigger control 112 and timing 108. Signal 131 controls the source of signal 159.

The delay counter 210 includes a synchronous clear input supplied by signal 217 this provides for the clearing of the value contained in the 13-bit delay counter 210. The synchronous clear signal 217 is derived from the trigger signal 119 in combination with the clock signal 105 via an arrangement of two flip-flops 212 and 214 and a gate 216 connected as illustrated. When the transmit trigger, signal 119, goes high at the start of a transmit sequence it generates a pulse one clock cycle long on signal 217. The start of transmit pulse on signal 217 lasts for one clock cycle starting on the first positive clock edge after signal 119 has gone high. The delay counter is set to zero on the next positive clock edge. The delay counter 210 is counted up using the clock signal 105 and outputs a delay count value on a delay bus 111 to the 13-bit equality comparator 244. The clear signal is also used to pre-load a latch 218 which is clocked by an output 219 of the 13-bit equality comparator 244, connected as illustrated to the counter 210 and the latch 208 to compare the outputs thereof. The latch 218 outputs a signal 123 providing the second input to the multiplexer 127.

Figure 5B:
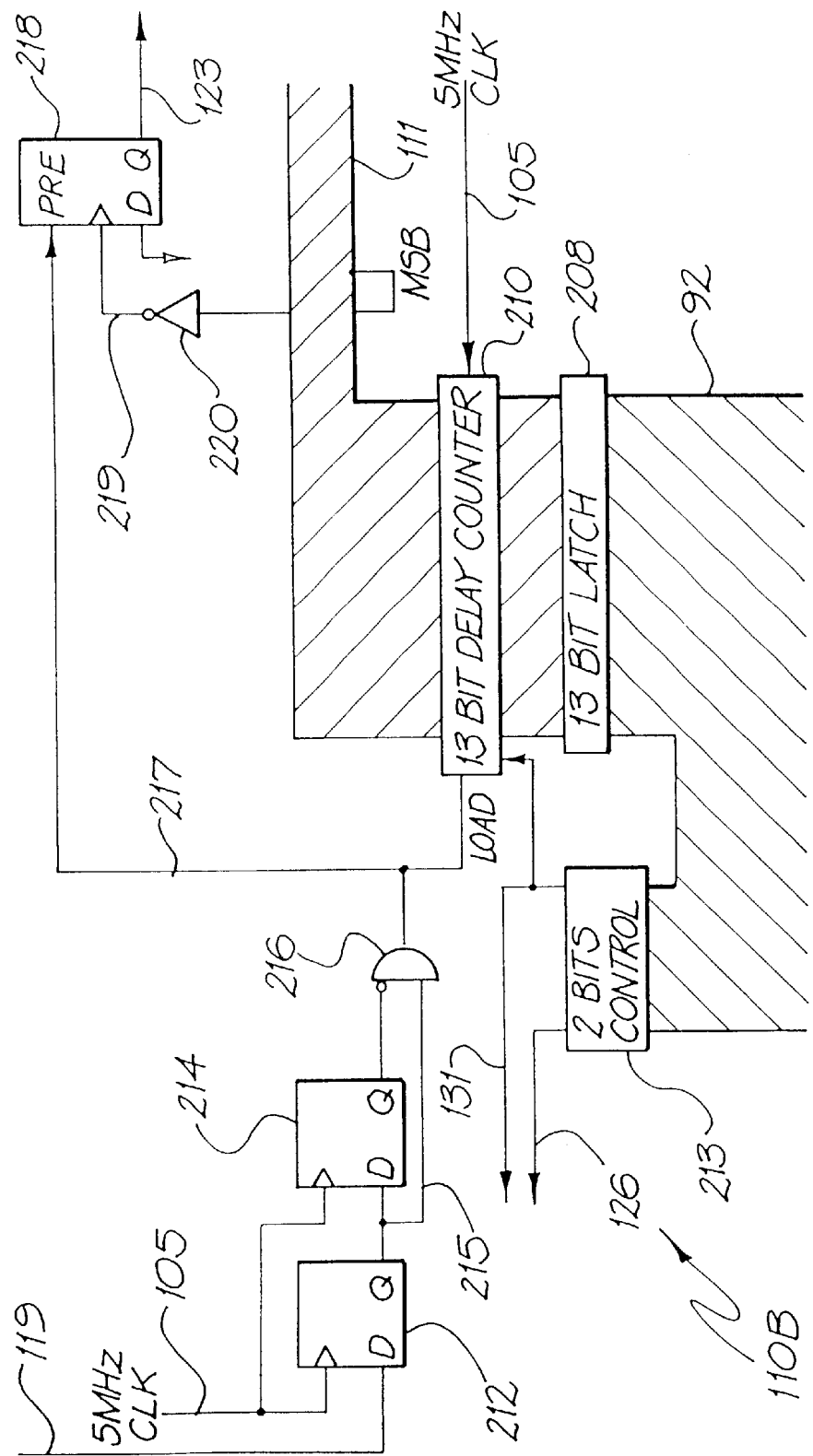
FIG. 5B is a similar representation of an alternative embodiment of the delay timer of FIG. 1.

FIG. 5B shows an arrangement of a delay timer 110B corresponding to the implementation of Option (3), where like components (seen in FIG. 5A) have been provided with the same reference numerals, and to which a generally similar description applies. In FIG. 5B however, output of control unit 213 signal 131 does not clear the delay counter it sets it (the delay counter) to 00010 00000000. Latch 208 is configured to load the 13-bit delay counter 210, using the start of transmit pulse, signal 217, which is provided to the load input thereof. The load signal 217 is also used to preset the latch 218. The delay counter 210 couples directly to the delay bus 111 where it connects to the peak amplitude measurement circuit 166. The delay counter 210 is counted up using the clock signal 105. When first started the counter counts from 00010 00000000 until loaded with the value contained in latch 208. The delay counter then counts up through 111111 11111111. When the counter counts from 11111 11111111 to 00000 00000000 the 1 to 0 transition of the most significant bit of the delay bus 111 is detected via an inverter 220 to form signal 219 this provides the clock signal to the latch 218. The D input of the D flip-flop 218 is tied low so the 0 to 1 transition of signal 219 causes the D flip-flop to be clocked and output 123 goes low.

The following holds true for waveforms arriving at different times after the transmit. A delay counter initialised as for Option (2) or Option (3) above and allowed to continue counting while the received signal is arriving has a fixed relationship with a received waveform. For a given frequency of received waveform, the same delay counter value will occur when the same portion of received signal is arriving. The value that the delay counter is compared to is dependent on the received signal frequency and which peak is being measured. It is independent of the received signal delay. The value to which the delay counter is compared does not have to be updated for every peak measurement. In some configurations, that value may be hardwired.

The amplitude of the waveform peaks may be obtained in two possible ways:

Peak Method (1) The sample and hold is opened when the delay counter has a value that indicates that the desired peak will be the next to arrive. The sample and hold is closed when the delay counter has a value that indicates that the desired peak has passed. A peak detector is used to hold the peak value of the received signal until the sample and hold can be closed. This method can only measure envelope peaks of the one polarity and then only if they are larger than the preceding peaks. Two digital comparators are required.

Peak Method (2) The sample and hold is opened when the delay counter has a value that indicates that the desired peak will be the next to arrive. The sample and hold is closed when a 90° phase shifted received signal passes through zero in the appropriate direction (ie. when the derivative of the signal passes through zero). One digital comparator is required for each sample and hold. Changing the polarity of the derivative edge will allow the capture of peaks of an opposite polarity.

In both methods the electronics are simplified because the delay counter can be loaded with a delay such that the delay counter's six most significant bits are always 000000 or 111111 while received signal peaks of interest are arriving.

Figure 6A:
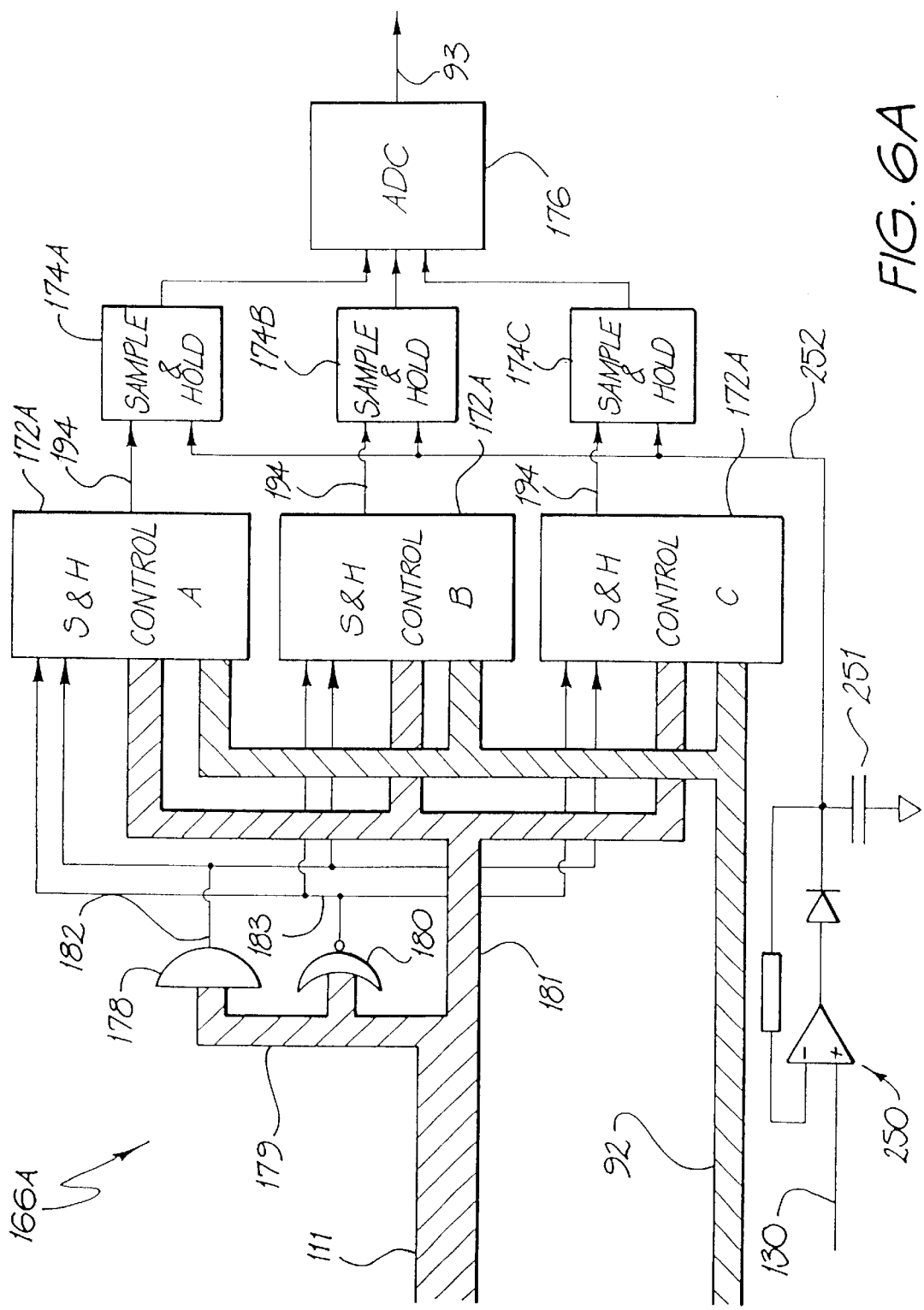
FIG. 6A is a schematic circuit representation of an embodiment of the peak amplitude measurement circuit of FIG. 1.
Figure 6B:
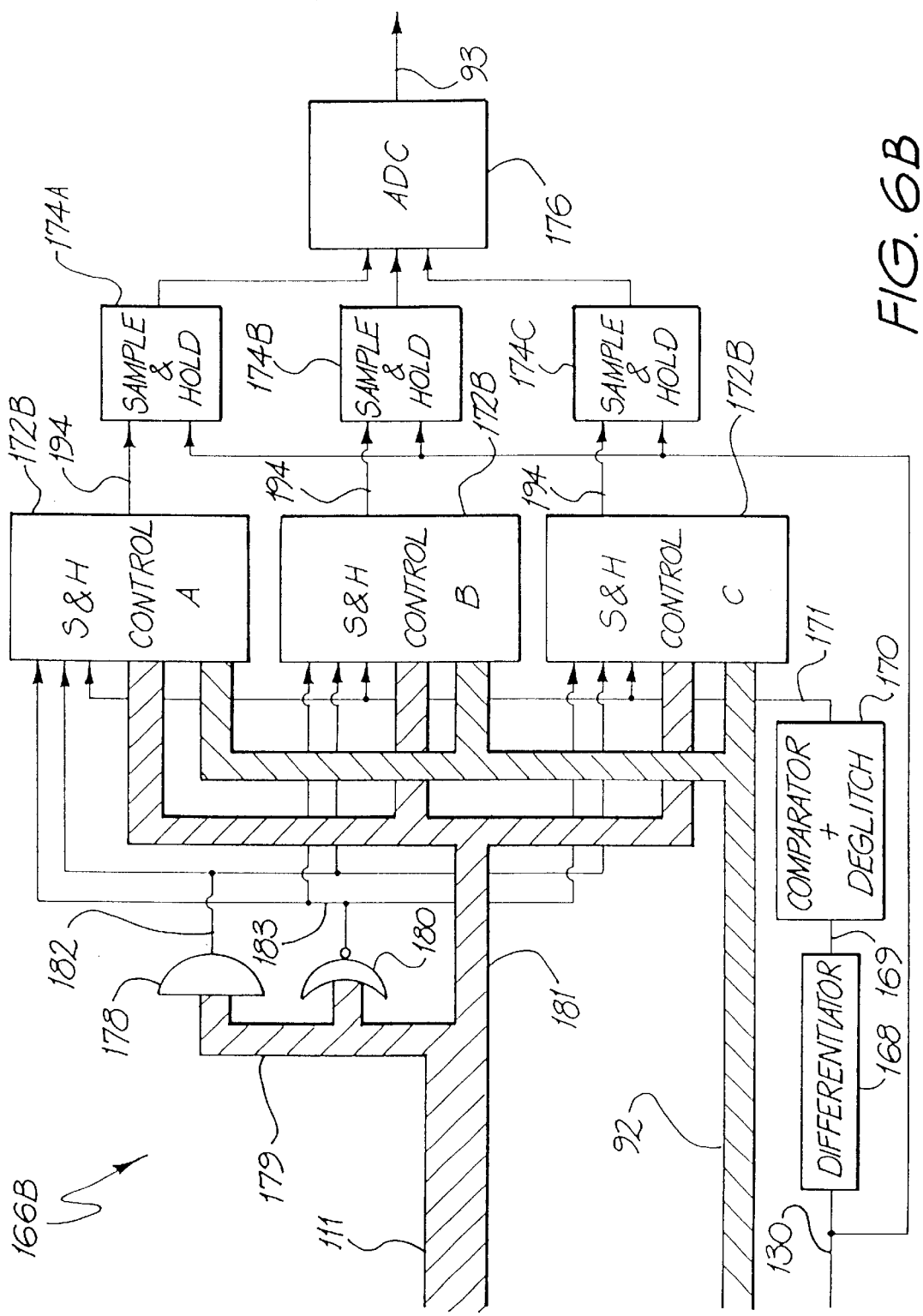
FIG. 6B is a schematic circuit representation of another embodiment of the peak amplitude measurement circuit of FIG. 1.

Turning now to FIG. 6B, one configuration of a peak amplitude measurement circuit 166B is shown which is formed from three parallel arrangements (A–C) of sample and hold circuitry. In each arrangement, a sample and hold control unit 172B is coupled to the delay bus 111 and to the microprocessor bus 92. Each of the control units 172 outputs a sample and hold control signal 194 to respective sample and hold units 174A–174C connected to the received signal 130 derived from the receive module 82. In this fashion, the peak amplitude measurement circuit 166B is configured to identify and measure the maximum amplitude of three peaks in the received waveform. In this connection, it will be appreciated by those skilled in the art that a square waveform, when transmitted, even as a single pulse, will generally be received as a series of sinusoidal-like waveforms of varying amplitude at the receiving transducer. Each of the sample and hold units 174A–174C output to an analog-to-digital converter 176 which converts the analog received value of the respective waveform peak into a digital value which is supplied to the microprocessor via the bus 93.

As seen in FIG. 6B, the received signal 130 is also input to a differentiator 168 which outputs a differentiated signal 169 to a comparator and deglitch circuit 170, the latter generating a slope polarity signal that is deglitched and output to each of the control units 172B via a line 171. The differentiator 168 is responsive to the rate of change of the received signal 130 and thus able to indicate either a positive or negative peak of the received signal 130 thus permitting the peak amplitude measurement circuit 166B to be responsive or selective to either positive or negative peaks in the received signal 130. The delay bus 111 is divided into two portions, the 7 least significant bits 181 being supplied directly to each of the sample and hold control units 172B with the 6 most significant bits 179 being input to an AND gate 178 and NOR gate 180. An output 182 of the AND gate 178 will be high when the 6 most significant bits of the delay bus 111 are each high, and an output 183 of the NOR gate 180 will also be high when the 6 most significant bits of the delay counter are each low.

FIG. 6A shows an alternative embodiment where the differentiator 168 and comparator/deglitch circuits 170 of FIG. 6B and the control timing signal 171 formed therefrom are replaced by a peak detector circuit 250 coupled to the received signal 130 which extracts the analog peak of the received signal and holds it, by virtue of the operation of a capacitor 251, on an input line 252 of the sample/hold circuits 174A–174C, until such are enabled by their respective control circuits 172A (A–C).

Figure 7A:
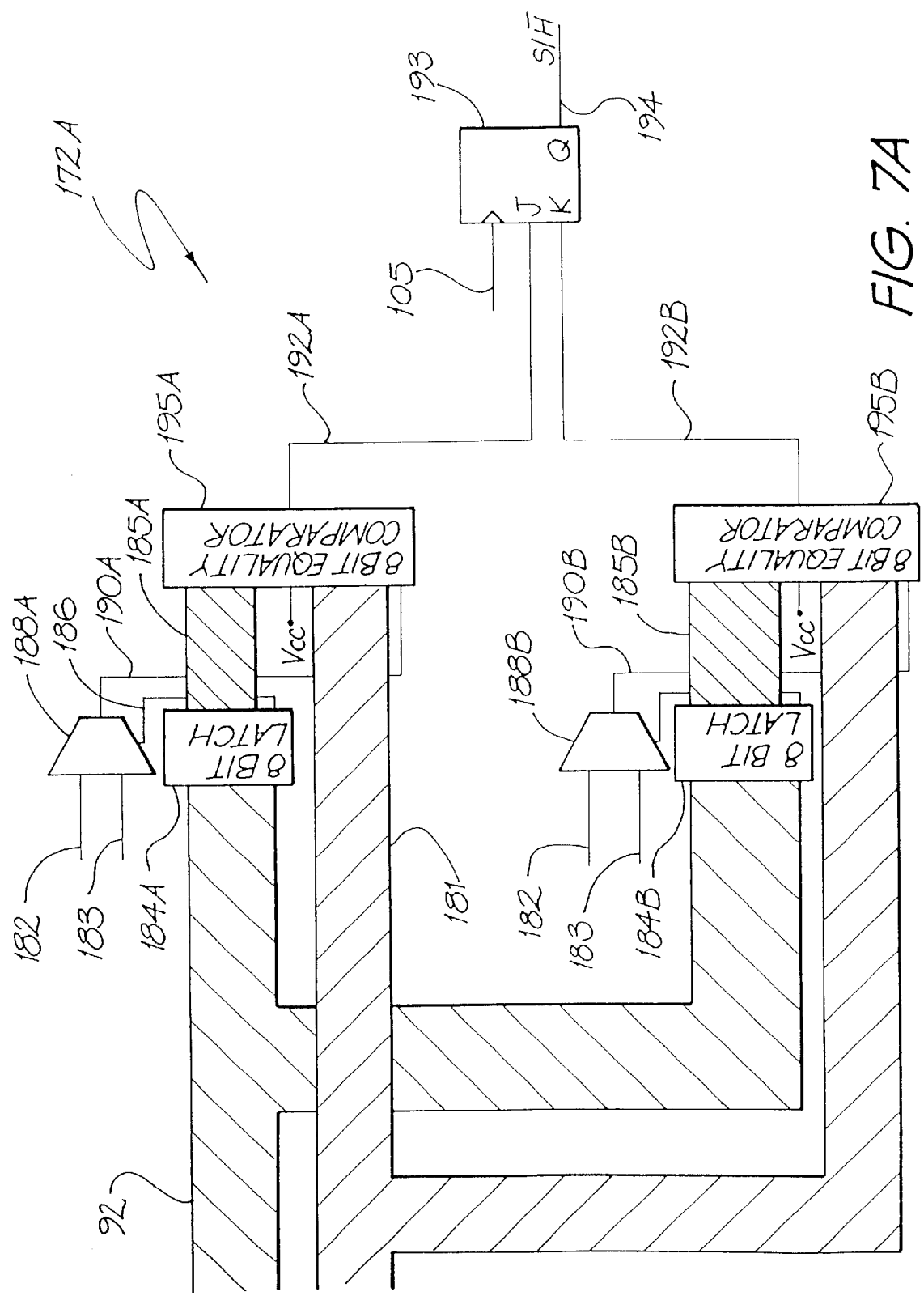
FIG. 7A is a schematic circuit representation of one embodiment of the sample and hold control units for use with the arrangement of FIG. 6A.

Turning now to FIG. 7A, one embodiment of the sample and hold control units 172A is shown to include two portions, each delimited by the identifier A or B. Portion A controls when the sample and hold opens while portion B controls when it closes. The arrangement of FIG. 7A is configured for implementation with the arrangements of FIGS. 5A and 6A for the implementation of Option (1) and Peak Method (1) described above. A value derived from the microprocessor bus 92 is supplied to a latches 184A and 184B, the 7 least significant bits of which are coupled via a buses 185A and 185B to corresponding first inputs of 8-bit equality comparators 195A and 195B. The most significant bit of the first input of the comparators 195A and 195B is held at a logical high. The most significant bit of the latches 184A and 195B are supplied to control corresponding multiplexers 188A and 188B input acting on lines 182 and 183. The output of the multiplexers 188A and 188B provide the most significant bit of the second input to the comparators 195A and 195B, the 7 least significant bits comprising the 7 least significant bits of the delay count of the delay bus 111. In this fashion, outputs 192A and 192B of the equality comparators 195A and 195B will be enabled when the value loaded from the microprocessor 90 matches the output from the delay timer 110 and an output 190A and 190B of corresponding multiplexers 188A and 188B.

When peak heights are being measured the most significant bits 179 of the delay count are either 111111 or 000000. this is achieved by loading the delay counter with an appropriate value. This delay counter delay value is calculated from the results of a single transmit, using amplitude detection.

The value loaded by the microprocessor 90 via bus 92 into latch 184A controls when the sample and hold 174 opens, and the value loaded into latch 184B controls when the sample and hold 174 closes. The seven least significant bits of the latch 184 contain the value that the delay counter 210 will have when it is desired that the operation on the sample and hold 174 be performed. The most significant bit of latch 184A or B causes the corresponding multiplexer 188A or B to select either signal 182 or 183. Signal 182 is true from 128 counts before the delay counter 210 rolls over and remains true until counter roll over when signal 183 becomes true for 128 counts.

Thus it is only necessary to derive a fine time resolution value from the microprocessor via the bus 92. A latch 193 is provided whose J and K inputs are respective outputs 192A and 192B of the comparators 195A and 195B and which is clocked via the clock signal 105. In this fashion, a sample and hold signal 194 is enabled at the time at which the delay timer 110 corresponds to a time within the receive waveform half cycle before the anticipated peak. Signal 192A goes high for one clock cycle of the 5 MHz clock 105 and latch 193 is set on the next clock edge. This enables the sample and hold. Later, signal 192B goes high for one clock cycle of the 5 MHz clock 105 and latch 193 is cleared on the next clock edge. This disables the sample and hold.

Figure 7B:
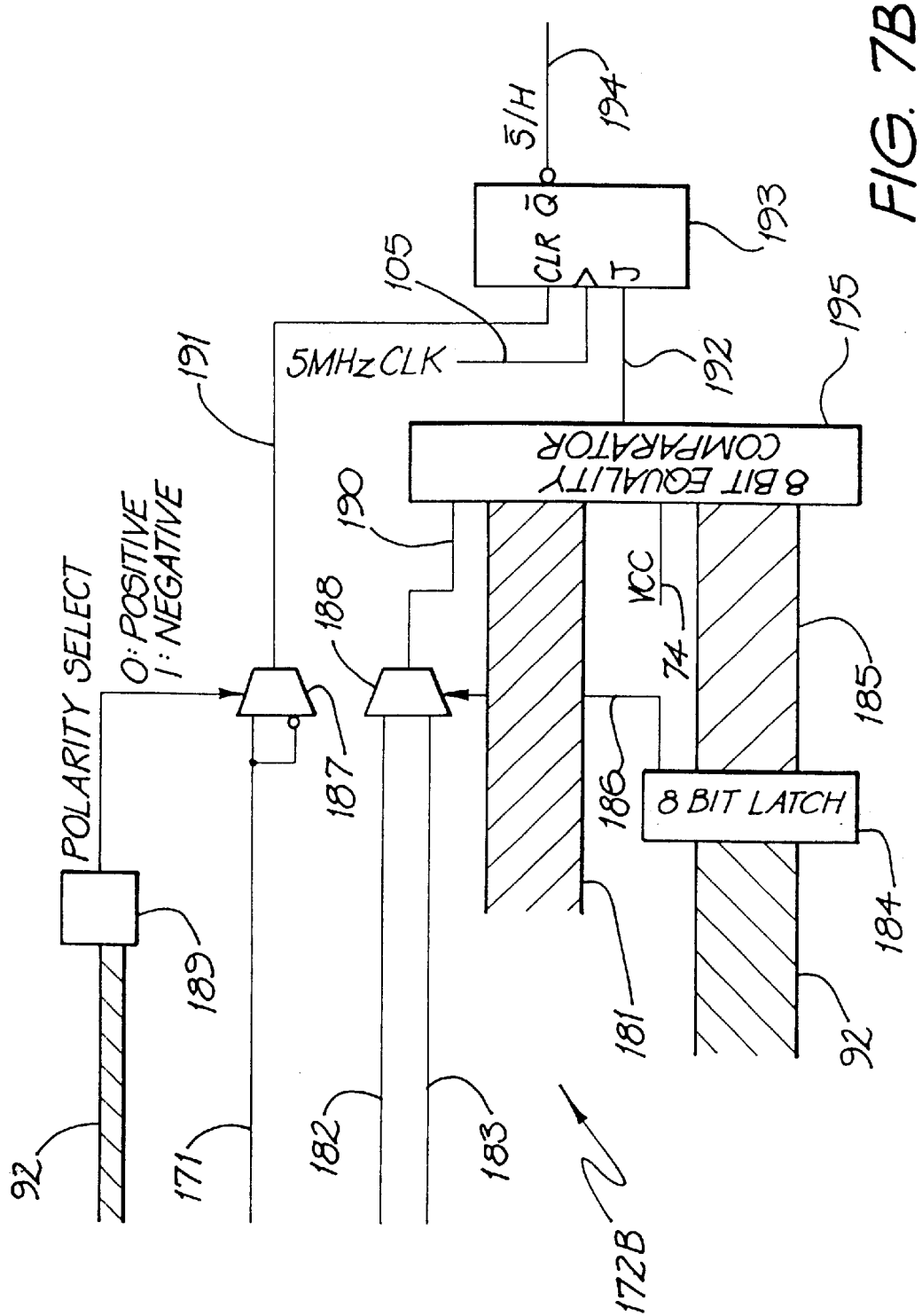
FIG. 7B is a similar representation of another embodiment of the sample and hold control unit for use with the arrangements of FIG. 6B.

The arrangement of FIG. 7B is configured for implementation with the arrangements of FIGS. 5B and 6B for the implementation of Options (2) or (3), and the Peak Method (2) described above. The circuit of FIG. 7B is generally similar to that of FIG. 7A and corresponding components are provided with like reference numerals. Notably, this arrangement utilizes a single comparator (195) for each sample and hold, and the derivative edge signal 171. The signal 171 derived from the differentiator 168 changes state when the received signal starts to reduce in amplitude. This transition is used to clear the latch 193 and place the sample and hold into hold mode.

Figure 8:
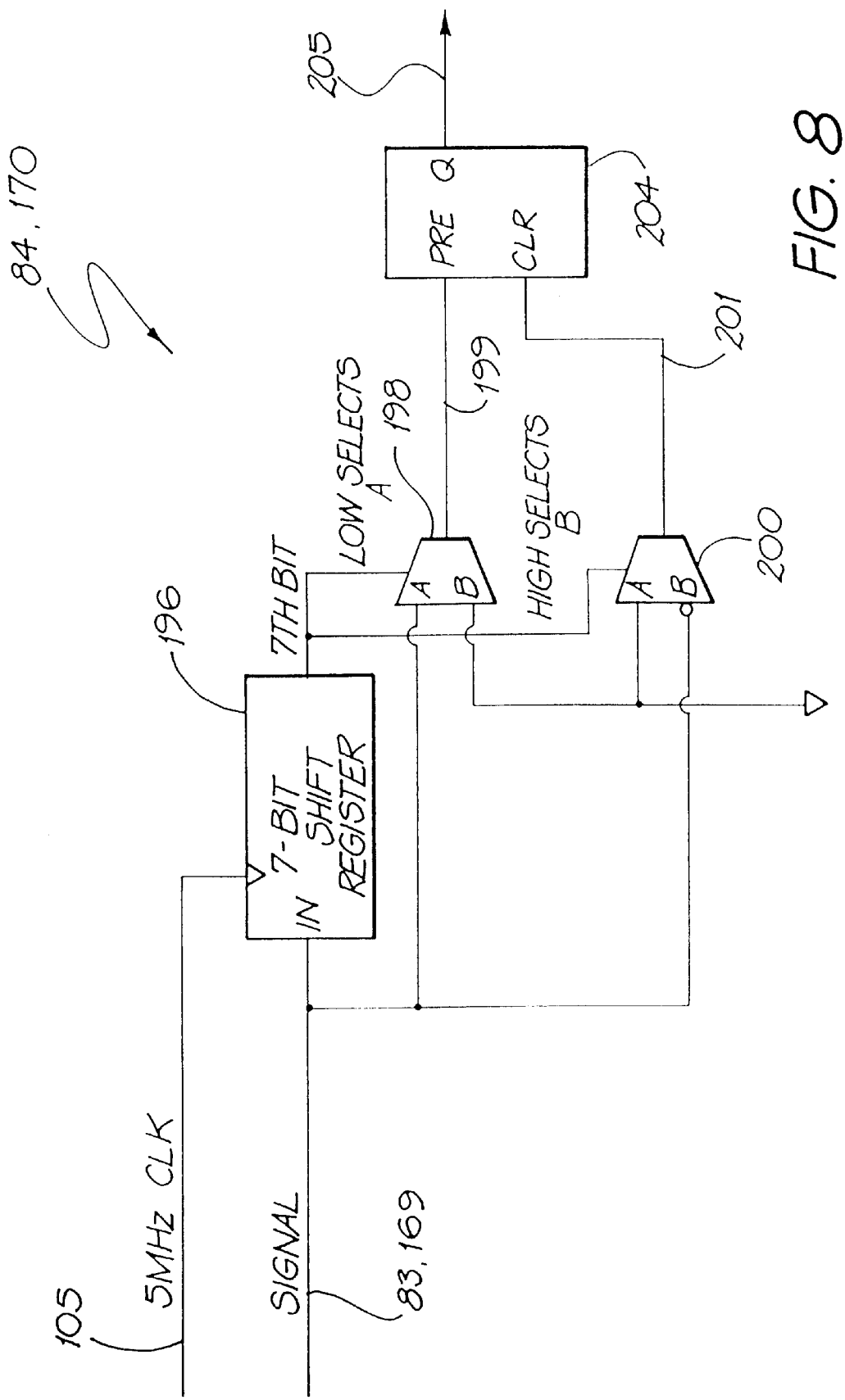
FIG. 8 is a schematic circuit representation of the deglitch circuits shown in FIG. 1 and FIG. 6A.

FIG. 8 shows the arrangement of the deglitch circuits 84 and 170 where an input signal (either 83 or 169) is input to a 7-bit shift register 196 clocked via the clock signal 105. The input signal is also provided to a pair of multiplexers 198 and 200 whose output is switched via the 7th-bit or the 7-bit shift register 196. The multiplexers have their alternative inputs connected to a logical zero and their outputs 199 and 201 connected to a preset and clearing input respectively of a latch 204 an output 205 of which represents an output of the deglitch circuits 84 and 170.

The frequency of the received signal is a function of the temperature and can be estimated from the temperature. The frequency of the received waveform can also be measured by measuring the time to two or more zero crossings of the received waveform. The frequency can then be calculated from the difference. This measurement can be performed by carrying out two or more transmissions in the same direction. Different waveform zero crossings are selected for successive ringarounds by using different values for the delay counter 210. Another alternative is to start a counter with the next zero crossing selected by the delay counter and to stop the counter on a following zero crossing.

Four Pulse Transmit Sequence

A ring-around sequence is usually made up of groups of four transmissions. The sequence of four is made up of three transmissions made up of pulses of one polarity while the fourth is inverted with respect to the first three transmissions. The fourth received pulse is inverted and requires detection of a zero crossing of direction opposite to that required by the first three received pulses. As seen in FIGS. 9A and 9B, the firing sequences are derived from bursts of one or more square waves. FIG. 9A shows the pulses applied by the drivers X and Y to the transducer leads 68. Driver Y complements driver X. As seen in FIG. 9A, driver X commences with a burst 224 of 3 negative-going pulses, followed approximately 500 μsec later (determined by the ring-around) by a similar burst 225. A third burst 226 of negative-going pulses is emitted. The burst 226 ends at a level 227 corresponding to that from where it commenced. Then, the level is slowly ramped down 228 to an opposite level 229. This is done to reduce unwanted acoustic transmissions. This establishes the commencement level for the next (inverted) burst 230 of positive-going pulses where the last pulse ends and is followed by a further ramp 231 to a level suitable for a following burst of negative pulses.

For a ring-around sequence comprising 16 wave packet transmissions, such a phase sequence will be as follows:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| + | + | + | − | + | + | + | − | + | +  | +  | −  | +  | +  | +  | −  |

FIGS. 9C and 9D show corresponding sequences where each wave packet is formed from a single (monostable) square pulse 232. Again, a slow ramp 233 is slewed to alter the commencing level for the inverted pulse 234 in the sequence.

To generate the four pulse transmit sequence mentioned, the signal applied to the transducer must be slewed (FIG. 9C point 233) to establish the commencement level required to generate the inverted pulse. After the inverted pulse is transmitted 234 the transducer signal is slewed in the opposite direction 233 to return to the initial state.

Figure 19:
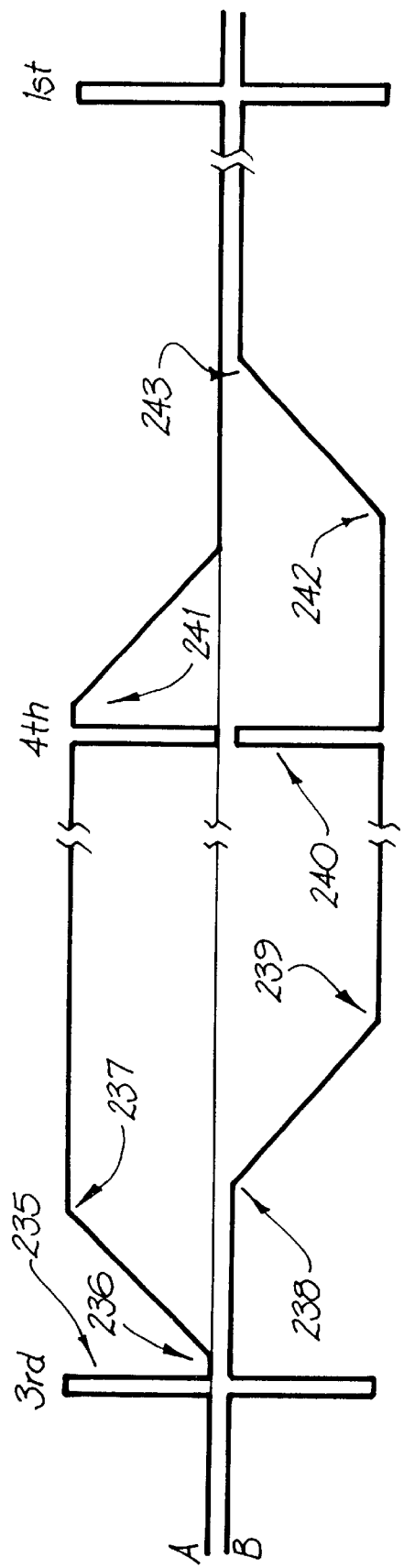
FIG. 19 shows in detail the transducer firing sequences.
Figure 20:
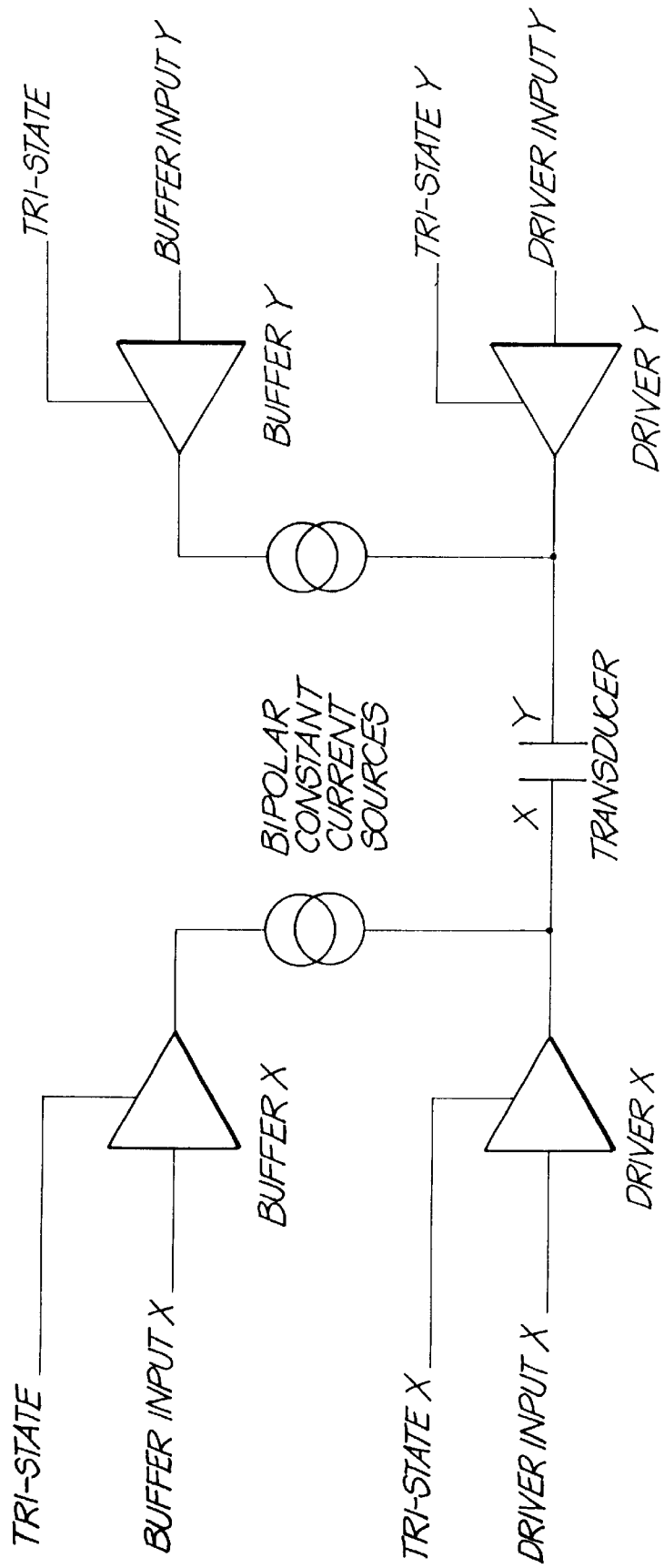
FIG. 20 illustrates the arrangement of the tri-state drives of FIG. 1.

FIG. 19 shows this region of the transmit sequence in more detail. The circuit used to achieve this is shown in FIG. 20. After the third transmission pulse the switch and driver control unit 120 sets the ramp direction. The signal applied to the X side of the transducer is set to ramp up and the Y side is set to ramp down. The ramp voltages are generated by two bipolar constant current sources. Each current source is fed from a tri-state buffer driver similar to the transducer drivers. Ramp direction is set by the logic level present at the buffer's input and the current sources are switched off by tri-stating the buffers.

Having set the initial ramp directions, the ramp buffer X is enabled 235 and a constant current flows to ground via the driver X. The ramp signal is started 236 by tri-stating the driver X and the current then charges the transducer. The ramp takes approximately 80 µs to complete 237 after which the switch and driver control unit 120 enables the ramp buffer Y, and then tri-states driver Y 238. The signal applied to the Y side of the transducer then begins to ramp down. Again, after 80 µs, the switch and driver control unit 120 inverts the driver input signals and then enables the drivers 239. The switch and driver control unit 120 then waits for the inverted fourth transmission pulse 240.

After the fourth pulse has been transmitted the logic levels at the inputs of the ramp buffers are inverted; then the buffers are enabled, and driver X is tri-stated 241. The signal applied to the X side of the transducer then ramps down. After 80 µs driver Y is tri-stated and the Y signal ramps up 242. The switch and driver control unit 120 waits for the ramp to finish before restoring the initial logic levels on the driver input, and then enabling the drivers. The ramp buffers are then tri-stated 243 which switches off the constant current sources. The circuit is then ready to repeat the sequence until the ring-around is complete.

Measurement Sequence

For clarity, the use of groups of three normal and one inverted pulse described above in the transmit sequence will be omitted from the following description.

Step 1: The ring-around measurement sequence is started by the microprocessor at a time determined by the time of day clock. The switch and driver control unit 120 is set so that transmission occurs in a particular direction with respect to fluid flow (eg. from transducer 54A to 54B). The CMOS switches 78 are set so as to connect the receive transducer to the receive module 82.

Step 2: A gain adjustment is made to the receive module 82 via the amplifier 142. In step 2, a short acoustic pulse is transmitted (eg. by transducer 54A) and is picked up by the transducer at the other end (eg. transducer 54B). The signal from the receive transducer passes through CMOS switches 78, differential current preamplifier 136, amplifier 138, band pass filter 140, a variable-gain amplifier 142 to the amplitude comparator 146. The DAC 144 supplies the threshold VPR voltage for the comparator 146. The value used for the threshold is the maximum voltage desired for the received signal envelope. The DAC 144 uses 147 and 145 as voltage references. The microprocessor 90 then holds a reset on the amplitude latch 124 via the signal 126 and initiates a transmit. When the transmit is finished, the microprocessor 90 removes the preset on the amplitude latch 124 and then goes into wait mode for 600 µs or until woken by an interrupt initiated by signal 159 on detection of a received signal. The output 125 of the amplitude comparator 146 is used to set the amplitude latch 124 if the signal exceeds VPR. When the microprocessor 90 comes out of wait mode, it examines the output 128 of the amplitude latch 124 via the multiplexer 127 to determine if the gain needs to be increased or reduced. The gain of the amplifier 142 is adjusted after each reception. This process is repeated until the maximum positive amplitude of the received signal approximates VPR.

Step 3: A single pulse of ultrasound is transmitted from transducer 54A and the delay timer 110 is started.

Step 4: The arrival of the pulse at the receive transducer 54B is detected using the comparator 146 with the adjustable threshold 141 derived from the DAC 144.

In steps 3 and 4, the value ETH, used for the comparator threshold 141, is such that it lies between the amplitudes of the two peaks preceding the zero crossing for which detection is required. The microprocessor 90 starts the timer 108, synchronously initiates a transmit, selects the polarity of the next active zero crossing via the module 189 (FIG. 7B), and sets the timer 108 to stop on the next active zero crossing. A short acoustic pulse is transmitted from an ultrasonic transducer (54A) at one end of the measurement tube 56, and is picked up by a transducer (54B) at the other end. The signal is then passed through a variable-gain amplification chain 136, 138, 140 and 142 to the amplitude comparator 146 and zero crossing comparator 148. When the amplitude of the received signal 143 exceeds ETH, the amplitude comparator 146 switches and activates the zero-crossing electronics so the arrival of the next zero crossing going in the pre-selected direction stops the timer 108. The value in the high speed timer 108 thus provides the time from the start of a transmit to a specific zero crossing in the received waveform. This time is not accurate enough for a gas flow measurement but allows a zero crossing to be identified in a waveform.

Step 5: The result of the single transmit-receive measurement is used to calculate the value for the delay timer 110 which will cause it to time out within the cycle before the zero crossing of nominated polarity on which it is desired that a re-transmit occur. The microprocessor 90 loads a value calculated from the single transmit into the latch 208.

In a particular implementation, the delay counter 210 effectively runs at half the frequency of the timing counter 108 so the first arithmetical operation performed is to halve the transmit time-number to account for the different clock frequency. The result represents the time from the start of the transmit to the instance when the sought-after zero-crossing occurred. In a ring-around sequence, the re-transmit electronics are armed just before an appropriate output from the comparator 148. For this purpose a (constant) adjustment is made to the time delay. This adjustment must be such that the delay timer 110 times out and enables the re-transmit electronics before the re-transmit zero-crossing with an adequate safety margin. In this implementation the delay counter 210 counts from the loaded value up to zero so the last arithmetical operation performed is a two's-complement negation. The microprocessor 90 loads this number into the latch 208 ready to be loaded into the delay counter 210.

Step 6: The microprocessor starts the delay counter and removes the clear from the timer 108. The microprocessor then causes the trigger control to transmit a pulse sequence. Signal 119 from the trigger control changes state and this starts the timer 108, causes the delay counter 210 to load the value stored in the latch 208, and causes the transmit monostable to fire.

Step 7: A counter, configured in software within the microprocessor 90 that counts the number of transmissions is incremented. The polarity of the next transmission is set. The polarity of the active zero crossing is made compatible with the transmit.

Step 8: When the delay counter 210 counts from 1111111111111 to 0000000000000 the circuitry that causes a transmit on the next active zero-crossing is enabled.

Step 9: A transmit is initiated by the trigger control 112 when a zero crossing of the selected polarity is detected. Signal 119 is initiated and this causes the delay counter 210 to load the value stored in the latch 108. The system goes to step 7 unless one fewer than the required number of transmissions has occurred. In this case the system goes to step 10.

Step 10: A counter, configured in software within the microprocessor 90 that counts the number of transmissions is incremented. The microprocessor disables the transmit and sets timer 108 to stop on the first active zero crossing after being activated by the delay counter output. The polarity of the active zero crossing is made compatible with the transmit.

Step 11: When the delay counter 210 counts from 11111 11111111 to 00000 00000000 the circuitry that causes counter 108 to stop on the next active zero-crossing is enabled.

Step 12: The counter 108 is stopped when a zero crossing of the selected polarity is detected.

Step 13: The timer 108 value is noted and its count set to zero.

Step 14: Steps 2 to 13 are repeated for the other direction of transmission.

Step 15: Idle circuitry is turned off.

Step 16: The speed of the fluid is calculated.

Alternative Method

In this variation, the first transmit of a ring-around sequence is used to determine the delay time substantially as described in step 4. The identified zero crossing initiates a re-transmit, latches the current value of the timer 108 and starts the delay counter 210. While the signal is completing its second transit, the value latched from the timer 108 is used to calculate a terminal count for the delay counter 210. The value calculated must be such that a logical operation between it and the delay counter 210 becomes true about half a period of the received signal prior to the re-transmit zero crossing. The terminal count value is saved in the latch 244 (FIG. 5A) where it may be logically compared to the value on the delay counter 210. The re-transmit arming is switched from amplitude-detect mode to delay-timer mode before the arrival of the second receive signal. The re-transmit zero crossing is armed when the delay timer equals the terminal count in latch 244. The second and subsequent transits use a timed delay to identify the re-transmit zero crossing as described before.

FIGS. 10 to 18 provide a number of flow charts depicting operation of the preferred embodiment.

Figure 10:
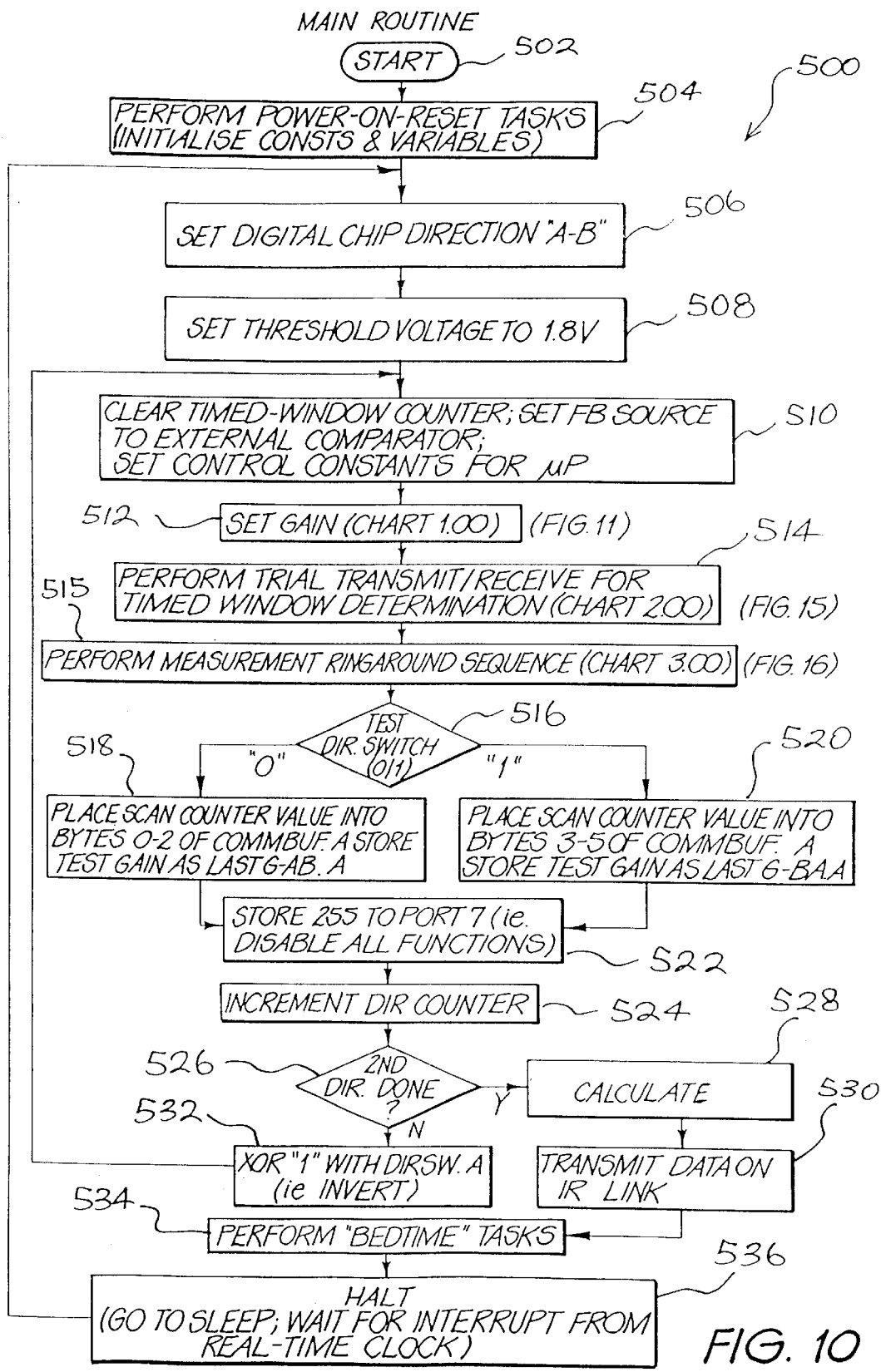
FIGS. 10 to 18 are schematic flow chart representations of the method of operation of the preferred embodiment.

Referring to FIG. 10, a start step of 502 commences "MAIN ROUTINE" 500.

Next, at step 504, various tasks related to power-on-reset of the microprocessor 90 are performed, including initialisation or clearing of registers and other memory elements.

Next at step 506, an initial transmit/receive direction (ie. upstream or downstream) between each of the transducers 54a and 54b is selected either by user input or default. This selection designated A-B and DIR.SWITCH is cleared.

Next at step 508, a value of 1.8 volts is written to THRESHOLD.VOLTAGE. This sets the voltage reference 147 (as earlier discussed in relation to FIG. 3) to a maximum signal amplitude that can be received by the receive module 82.

Next at step 510, a clearance of DIR.COUNTER is performed.

Further in step 510, an FB source for signal detection is set with an external comparator.

Finally in step 510, various control constants are written to the microprocessor 90.

Next at step 512, a subroutine entitled "SET GAIN" is called. This subroutine (later described) provides for adjustment of a gain value of the receive module 82 via amplifier 142. This subroutine returns a value which is stored in TEST.GAIN.

Next in step 514, a subroutine entitled "TRIAL TRANSMIT/RECEIVE FOR TIMED WINDOW DETERMINATION" is called. This subroutine (later described) returns an "arming delay value" which is written to PORT__0, for a specific direction of transmission (ie A-B or B-A) that was earlier set in step 506.

Next in step 515, a subroutine entitled "MEASUREMENT RINGAROUND SEQUENCE" is called. This subroutine (later described) performs an ultrasonic ring-around measurement in a single direction and stores that direction in DIR.SWITCH.

Next at step 516, the value of DIR.SWITCH is read to determine the direction (ie. A-B or B-A) just measured in step 515. In a first instance, this value will correlate with direction A-B as per step 508, however, in a subsequent loop, this will reverse to B-A.

Next, in step 518 or 520, a current value of SCAN.COUNTER is read and stored in COMMBUF.A byte. SCAN.COUNTER represents a current value of the high speed timing counter unit 108 which represents the total time of flight of the predetermined numbers (N) of acoustic signal pulses in each ring-around sequence. The actual location (ie bits 0–3 or bits 4–8) within COMMBUF.A that is actually used to store the current value of SCAN-.COUNTER depends on the result of DIR.SWITCH, being the direction read in step 516.

Further, the value of TEST.GAIN is returned by subroutine 512 is stored in the appropriate one of LASTG_AB.A or LASTG_BA.A.

Next in step 522, a value of 255 or 0111 1111 is written to PORT_7 so as to disable all relevant functions.

Next in step 524, a current value in DIR.COUNTER is incremented.

Next at step 526, the new value in DIR.COUNTER is read, to determine whether both directions A-B and B-A have been measured.

In the case of only one direction having been measured (eg A-B), then step 532 is proceeded to.

At step 532, the value of DIR.SWITCH is inverted, by an exclusive-OR (XOR) operation with "1" and step 510 is proceeded to, so as to repeat the subsequent steps in reverse direction (ie direction B-A instead of A-B).

However, if step 526 determines that both directions A-B and B-A have been measured, then step 528 is proceeded to.

Step 528 accordingly reads the data held for both directions held in bytes 0–2 and 3–5 of COMBUF.A respectively and calculates the average flow rate, in accordance with formula (1) earlier described.

Next at step 530, the calculated average flow rate is determined at step 528 is transmitted to an external destination.

Finally, at step 534, the microprocessor 90 performs any "bedtime" tasks which enable a standby state to be assumed. In such a state, the microprocessor 90 awaits an interrupt to initiate another measurement. Such an interrupt is caused by a time of day clock.

Figure 11:
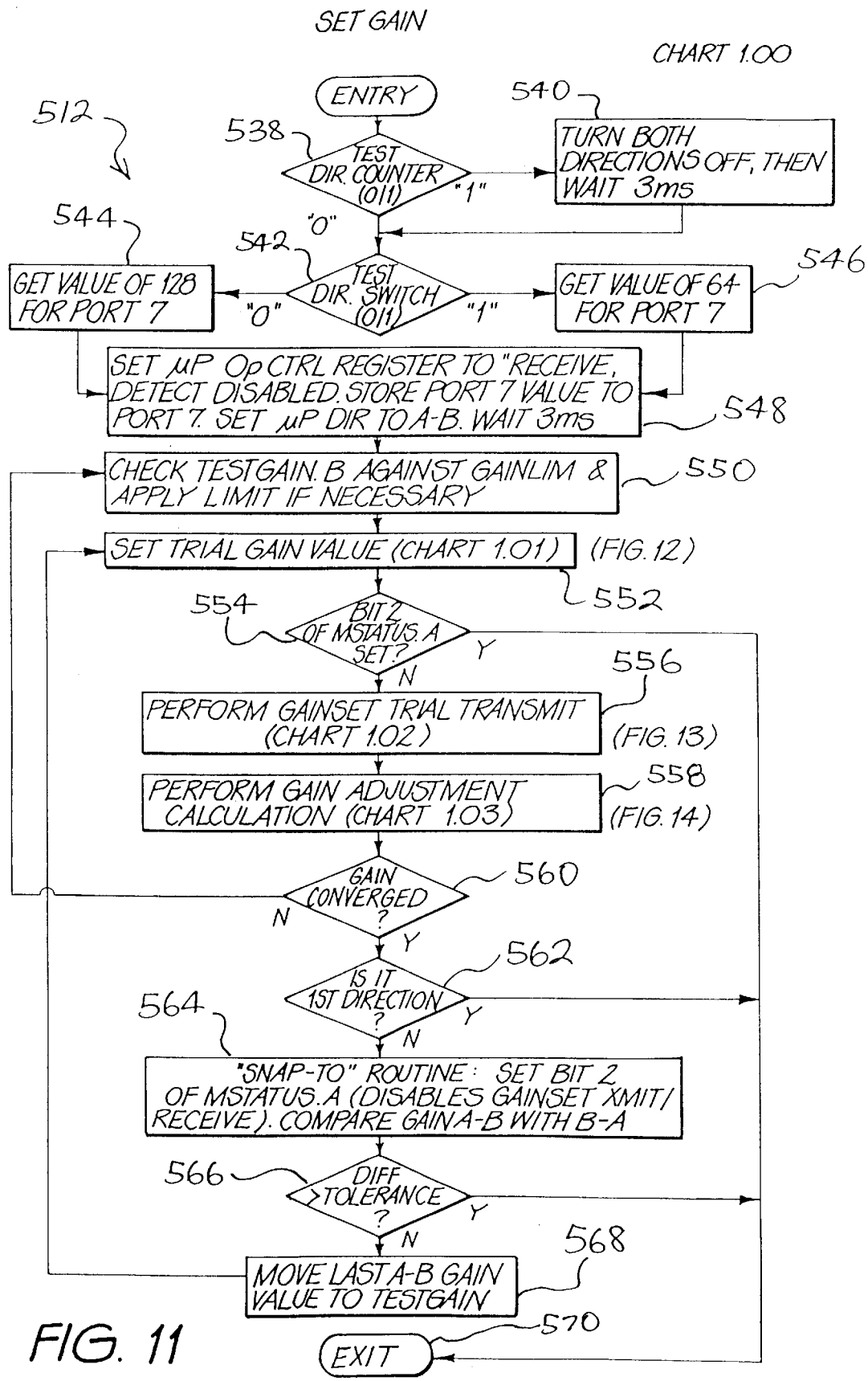

Referring now to FIG. 11, the subroutine "SET GAIN" 512 will be described.

Firstly, in step 538, a pre-existing value of DIR.COUNTER relating to the number of scans that have been earlier performed is read.

In the case that step 538 returns a result of logic 1, indicating that a scan has been previously performed, then step 540 is proceeded to.

At step 540, both directions are "turned off" and a delay of 3 milliseconds is provided, before proceeding to next step 542.

Next at step 542, any pre-existing value of DIR.SWITCH relating to the direction of scan (ie. upstream or downstream) is read. In the case of a logic 1 being returned, then a value of 64 or 0100 0000 is made, ready for storage to PORT_7.

However, in the case of a logic 0 being returned at step 542, then a value of 128 or 0111 1111 is made ready for storage to PORT_7.

From either step 544 or 546, step 548 is proceeded to. At step 548, the OP.CTRL register is written with data to disable the ability of the gas meter 50 to receive and detect.

Step 548 also involves writing the values determined in either step 544 or 546 to PORT_7. Step 548 also sets the next direction of measurement as determined at step 542 that is designated "A-B". A delay of 3 milliseconds is then applied.

Step 550, a comparison is made between values stored in each of TEST.GAIN and GAIN.LIM and any adjustment made accordingly.

Next at step 552, which follows calls a subroutine entitled "SET TRIAL GAIN VALUE". This subroutine (later described) uses the results of step 550 and makes appropriate adjustments to the gain pots.

Next at step 554, the value of bit 2 of MSTATUS.A is read. If set, then step 570 is proceeded to, causing a return to the main routine 500 otherwise, then step 556 is proceeded to, in which a subroutine entitled "GAINSET TRIAL TRANSMIT" is called. This subroutine (later described) returns an FB value for use in step 558.

Next in step 558, a subroutine entitled "GAIN ADJUSTMENT CALCULATION" is called. This subroutine 558 (later described) returns values which indicate whether the gain adjustment is converged (contracted) or not converged (expanded).

Next in step 560, the status of the gain adjustment (ie converged or not converged) is read. In the case of non-convergence being determined at step 560, then step 550 is returned to. However, in the case of convergence being determined at step 560, then a further test as to whether it relates to the first direction is performed at step 562.

If the convergence does relate to the first direction, then step 570 is proceeded to and the main routine 500 is returned to.

If the convergence does not relate to the first direction, then step 564 is proceeded to, in which gain set transmit/receive is disabled by setting logic 1 at bit 2 of MSTATUS.A. Also, the present values of GAIN A-B and GAIN B-A are compared.

Next at step 566, it is tested whether the difference between GAIN A-B and GAIN B-A is greater than a predetermined tolerance. If it is greater than a predetermined tolerance, then step 570 is proceeded to and control returned to the main routine 500.

Otherwise, if the difference is less than a predetermined tolerance, step 568 is proceeded to, in which TEST.GAIN is filled with data related to the previous A-B.GAIN value and step 552 returned to.

Figure 12:
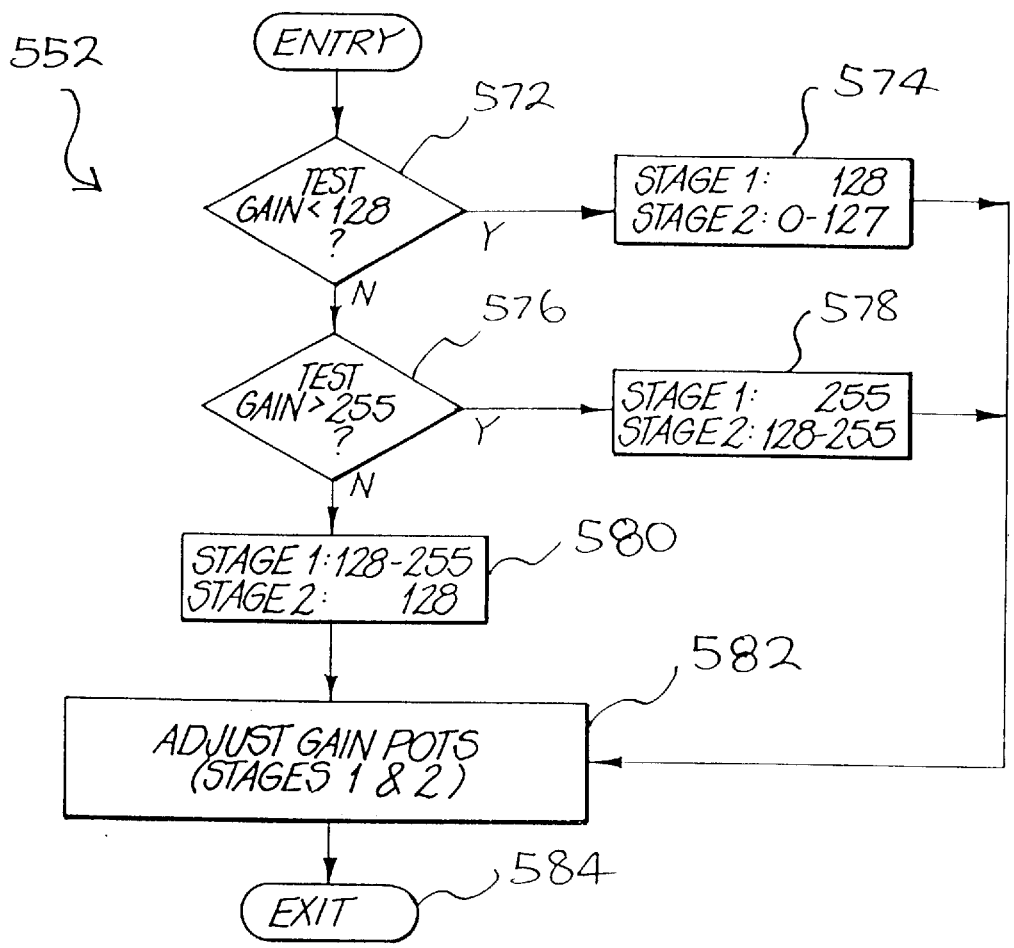

Referring now to FIG. 12, the subroutine "SET TRIAL GAIN VALUE" 552 will be described. Firstly, at step 572, TEST.GAIN is compared with a value of 128. If less than 128, then step 574 is proceeded to, in which stages 1 and 2 (of gain pots) are allocated. However, if TEST.GAIN is not less than 128, then another test at step 576 is performed. If TEST.GAIN is greater than 255, then step 578 is proceeded to, in which stages 1 and 2 (of gain pots) are allocated values of 255 and 128–255 respectively. Alternatively, if TEST.GAIN is not greater than 255, (although greater than 128 as per earlier step 572), then step 580 is proceed to, in which stages 1 and 2 (of gain pots) are allocated values of 128–255 and 128 respectively.

At step 582, the gain pots are adjusted, and at step 584, the subroutine is exited.

Figure 13:
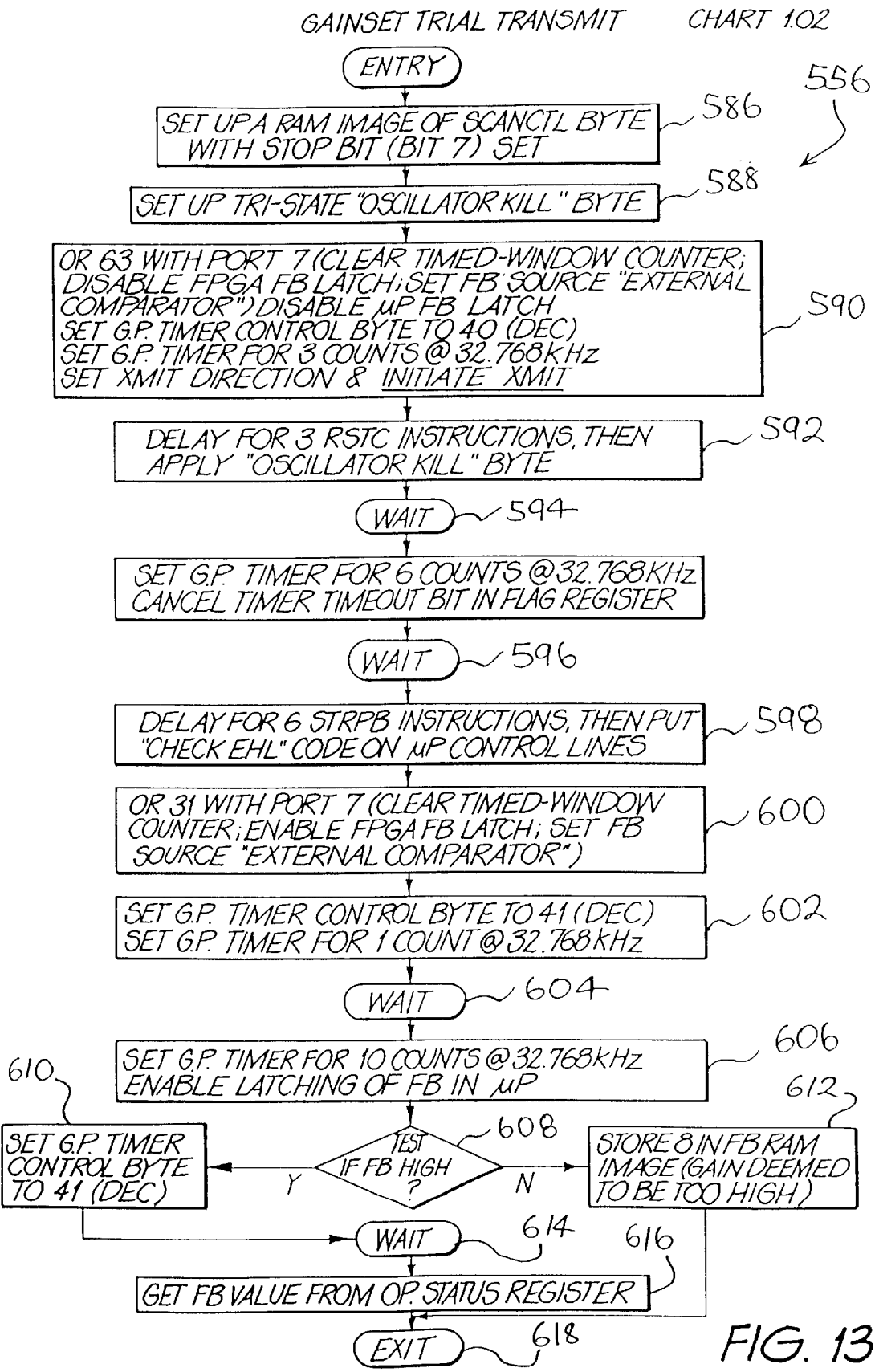

Referring now to FIG. 13, the subroutine "GAINSET TRIAL TRANSMIT" 556 will be described.

In step 586, bit 7 of a RAM image of SCAN.CONTROL is set.

Next in step 588, a register for tri-state oscillator kill byte is set.

Next in step 590, an OR function of 63 or 0011 1111 is performed with the contents of PORT_7. Further, a GP.TIMER control byte is set to 40 and GP.TIMER is set to 3. Further in step 590, a transmission is performed by sending an ultrasonic (oscillating) square wave signal from the transducer that has been established as a transmitter.

In step 592, a delay is provided.

Further in step 592, an "oscillator kill byte" is applied, to stop the oscillator at the transmission end.

At step 594, a wait/delay is applied.

Next at step 595, a value of 6 is written to GP.TIMER so as to set a delay, Also, the time out bit in FLAG.REGISTER is cleared.

At step 596 a wait/delay is applied.

At step 598 a "check EHL" code is placed on the microprocessor control lines.

Next in step 600, PORT_7 is subject to an OR function with 31. This clears TIMED.WINDOW.COUNTER, disables gate array FB latch and sets an FB source to an external comparator.

Next in step 602 a value of 41 is written to GP.TIMER CONTROL value of 41 and a value of one count is written to GP. TIMER.

Next at step 604 a delay is applied.

Next in step 606, the GP.TIMER is set at ten counts to enable latching of the FB in the microprocessor.

In step 608 it is tested whether FB is high. In the case of a positive test, then step 610 is proceed to, in which the GP.TIMER control byte is set to 41. However, if the test for FB is not high, then a value of 8 is stored in an image of FB RAM and the subroutine is exited.

After step 610, a delay or wait is applied at step 614.

Following from step 614, an FB value is read from the OP.STATUS register.

Finally, step 618 is proceeded to and control is returned to the calling subroutine "SET GAIN" 512.

Figure 14:
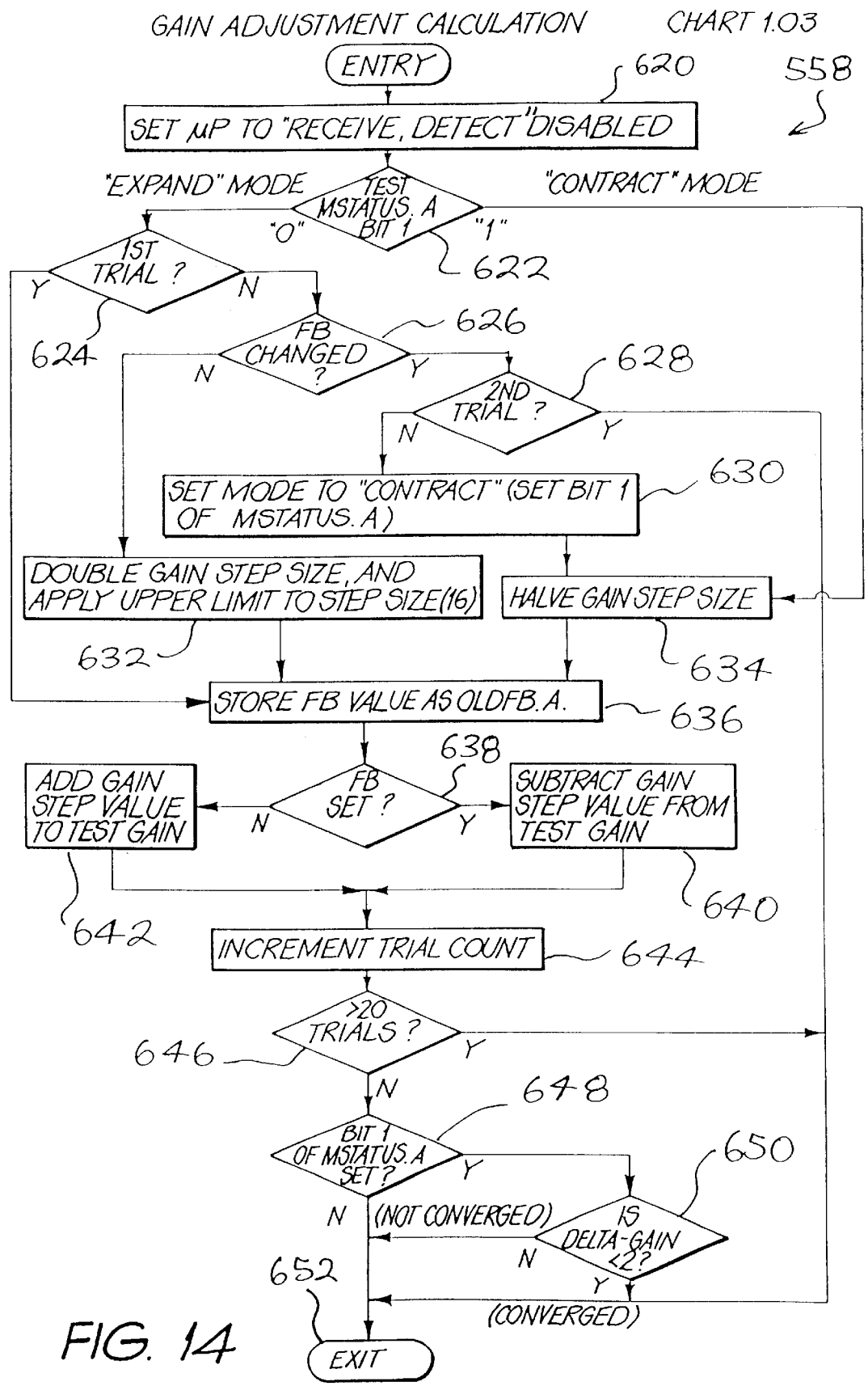

Referring now to FIG. 14, the subroutine "GAIN ADJUSTMENT CALCULATION" 558 will be described.

At step 620 the microprocessor 90 is set to disable the "receive, detect" status.

Next at step 622, it is determined from the MSTATUS.A register whether "expand" mode or "contract" mode applies.

In the case of "expand" mode, then step 624 is proceeded to in which it is tested whether a first trial is applied. In the case of a first trial having been applied, then step 636 is proceeded to in which FB value is stored as OLD FB.A.

However, if at step 624 a result of not first trial is a result, then step 626 is proceeded to in which it is tested whether FB has changed.

In the case of FB having been changed, then step 628 is proceeded to in which a further test as to whether a second trial is taking place is performed. In the case of a second trial having been performed at step 628, then the subroutine is exited at step 652, indicating that the gain is converged.

However, if at step 628 a second trial is not determined, then step 630 is proceeded to, in which a contract mode is set. Thereafter, step 634 is proceeded to in which the gain step size is halved. Thereafter, step 636 is proceeded to which has been earlier described.

If at step 626, it is determined that FB has not changed, then step 632 is proceeded to in which the gain step size is doubled and an upper limit of 16 is applied to the step size. Thereafter, it is proceeded to step 636.

From step 636, step 638 is proceeded to in which it is tested whether FB has been set. In the case of it not being set, then step 642 is proceeded to in which gain step value is added to the test gain. Otherwise, step 640 is proceeded to in which the gain step value is attracted from test gain.

In any case after either step 642 or 640, step 644 is proceeded to in which the trial count is incremented.

Thereafter, it is tested as to whether greater than 20 trials have been performed at step 646. In the case of an affirmative result, then the subroutine is exited. However, if less than 20 trials have been performed then another test is performed at step 648.

At step 648 the bit 1 of MSTATUS.A is tested. In the case of this bit being logic 1, then a further test is carried out at step 650. Otherwise, the subroutine is exited at step 652.

At step 650 it is determined whether the change in gain is less than 2, indicating either a converged state in the case of an affirmative result or a non-converged state in the case of a negative result.

Finally, step 652 is proceeded to and control handed back to the calling subroutine "SET GAIN" 512.

Figure 15:
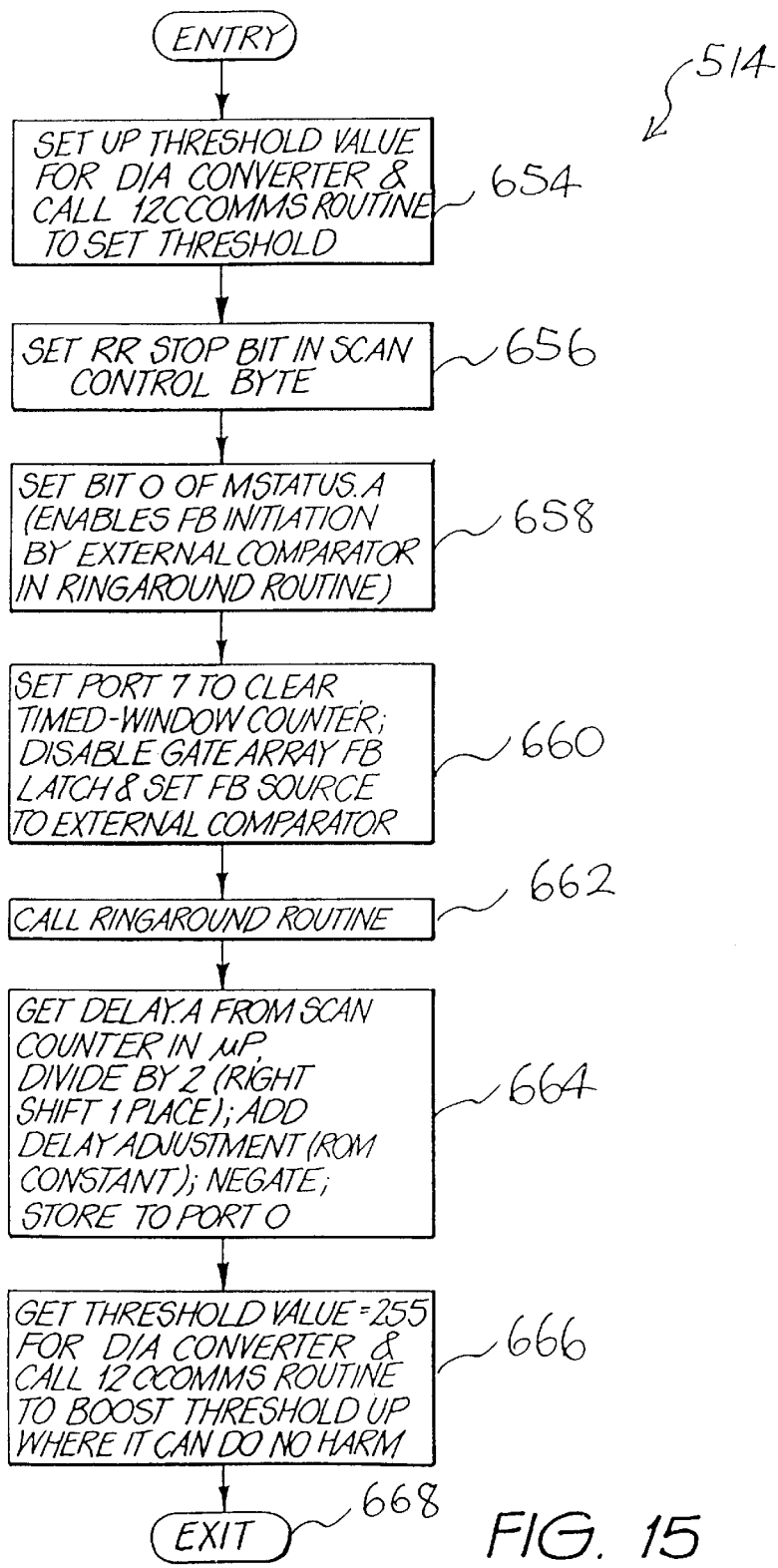

Referring now to FIG. 15, the subroutine "TRIAL TRANSMIT/RECEIVE FOR TIMED WINDOW DETERMINATION" 514 will be described.

In step 654, the value of THRESHOLD.VOLTAGE is applied to the digital to analog converter (DAC) 144, by calling an I²C routine.

Next in step 656, a stop bit is set to logic 1 in SCAN.CONTROL.

Next, in step 658, bit 0 of MSTATUS.A is set to logic 1 (to enable FB detection when subroutine 515 is called).

At step 660, TIMED.WINDOW.COUNTER is cleared by setting the relevant bits of PORT_7 to logic 1.

Further at step 660, FB detection is enabled but FB latching is disabled.

Next at step 662, a ring-around routine, being similar to the measurement subroutine is called. Such a ring-around routine returns a value of DELAY.A, which is stored in SCAN.COUNTER.

Next in step 664, DELAY.A is divided by two, summed with the delay adjustment constant, then negated and the result stored in PORT_0 as the "arming delay value".

Next at step 666, the threshold is maximised where it can do no harm.

Finally, in step 668, the main routine 500 is retuned to.

Figure 16:
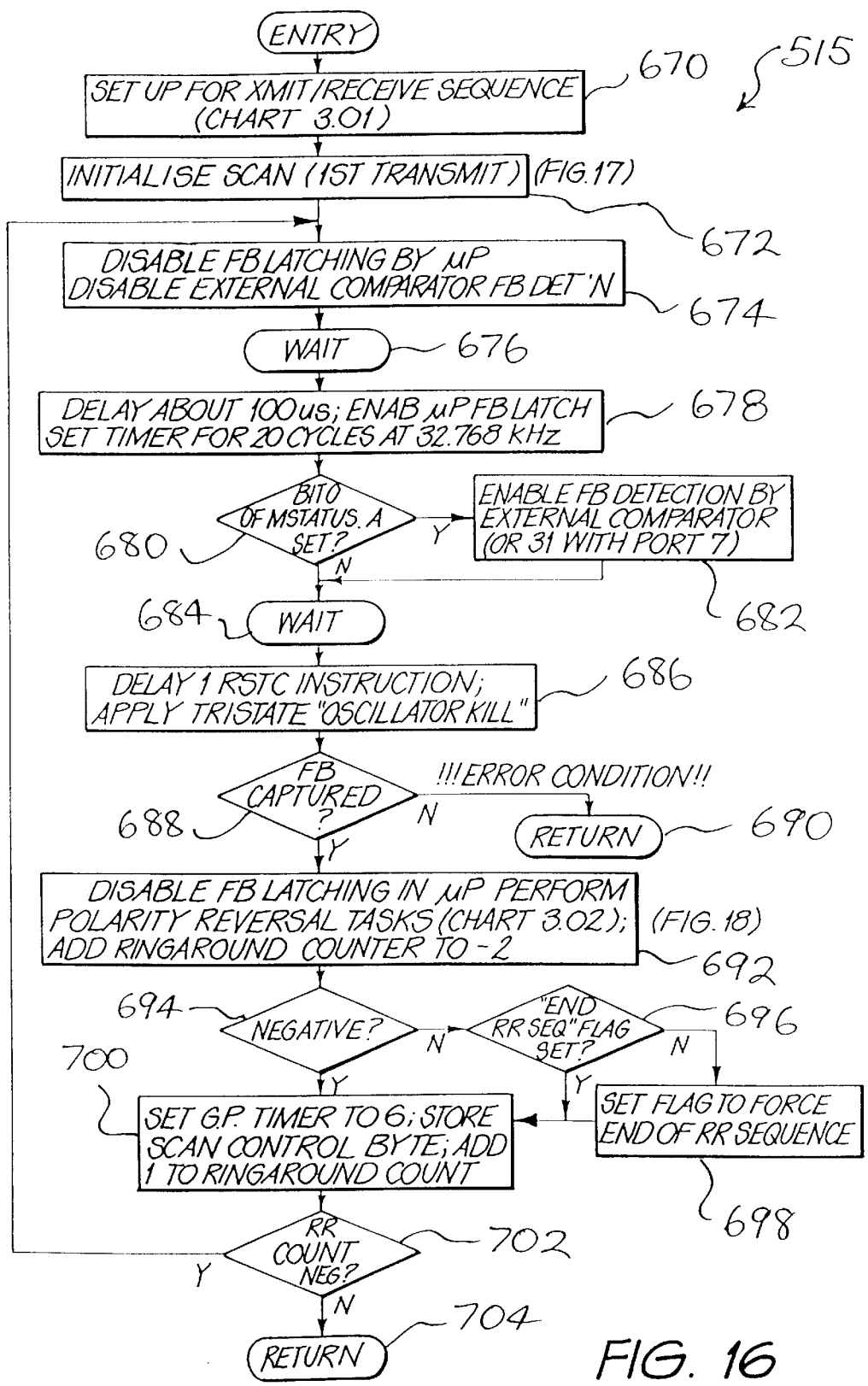

Referring to FIG. 16, the subroutine "MEASUREMENT RINGAROUND SEQUENCE" 515 will be described.

In step 670, initialisation of components ready for scanning is performed.

At step 672, a subroutine entitled "INITIALISE SCAN" is called, which provides for initialisation and readiness for a first transmission.

Next in step 674, the FB detection (by external comparator) and FB latching is disabled.

Next at step 676, a delay of around 100 μs is provided.

Next at step 678, FB latching is enabled.

Further at step 678, a timer is set (in this example for 20 cycles at 32.768 kHz).

Next at step 680, the value of Bit 0 in MSTATUS.A is read. In the case of a logic 1, then the FB detection is enabled by performing an OR operation with PORT_7 and 31 or 0001 1111.

Next at step 684, a delay of 1 RSTC instruction is provided.

Next at step 686, a tri-state "oscillator kill" signal is applied.

Next is step 688, it is determined whether FB is captured.

If FB has not been captured, then an error is considered to have occurred and control is returned to the calling main routine 500.

Otherwise if FB has been captured, then step 692 is proceeded to.

In step 692, FB latching is disabled.

Further in step 692, a subroutine entitled "POLARITY REVERSAL TASKS" is called, which controls the polarity of the transmission pulse to be next transmitted.

Further in step 692, the value of RINGAROUND-.COUNT is added to an initial value of −2.

Next at step 694, the new value of RINGAROUND-.COUNT is read. If the result is a negative value, indicating that all of the transmission signals have been set for the current direction, then step 700 is proceeded to.

However, if the result of step 694 is not a negative value, indicating that the required number of scans has been performed for this direction, then step 696 is proceeded to.

In step 696, a value of END.RR.SEQ flag is read. If the flag is not set, then it is written with logic 1 so as to force an end to the Ringaround Sequence Measurement (ie. being returned to step 674).

Next in step 700, a value of 6 is written to GP.TIMER.

Further in step 700, a value is written to SCAN-.COUNTER.

Further in step 700, a value of 1 is written to RINGA-ROUND.COUNT.

Next in step 702, the value of RINGAROUND.COUNT is read. In the case of a negative value, then step 674 is proceeded to, so that the Ringaround Sequence Measurement can be performed again.

However, if the value of RINGAROUND.COUNT is not negative, then step 704 is proceeded to, in which main routine 500 is returned to.

Figure 17:
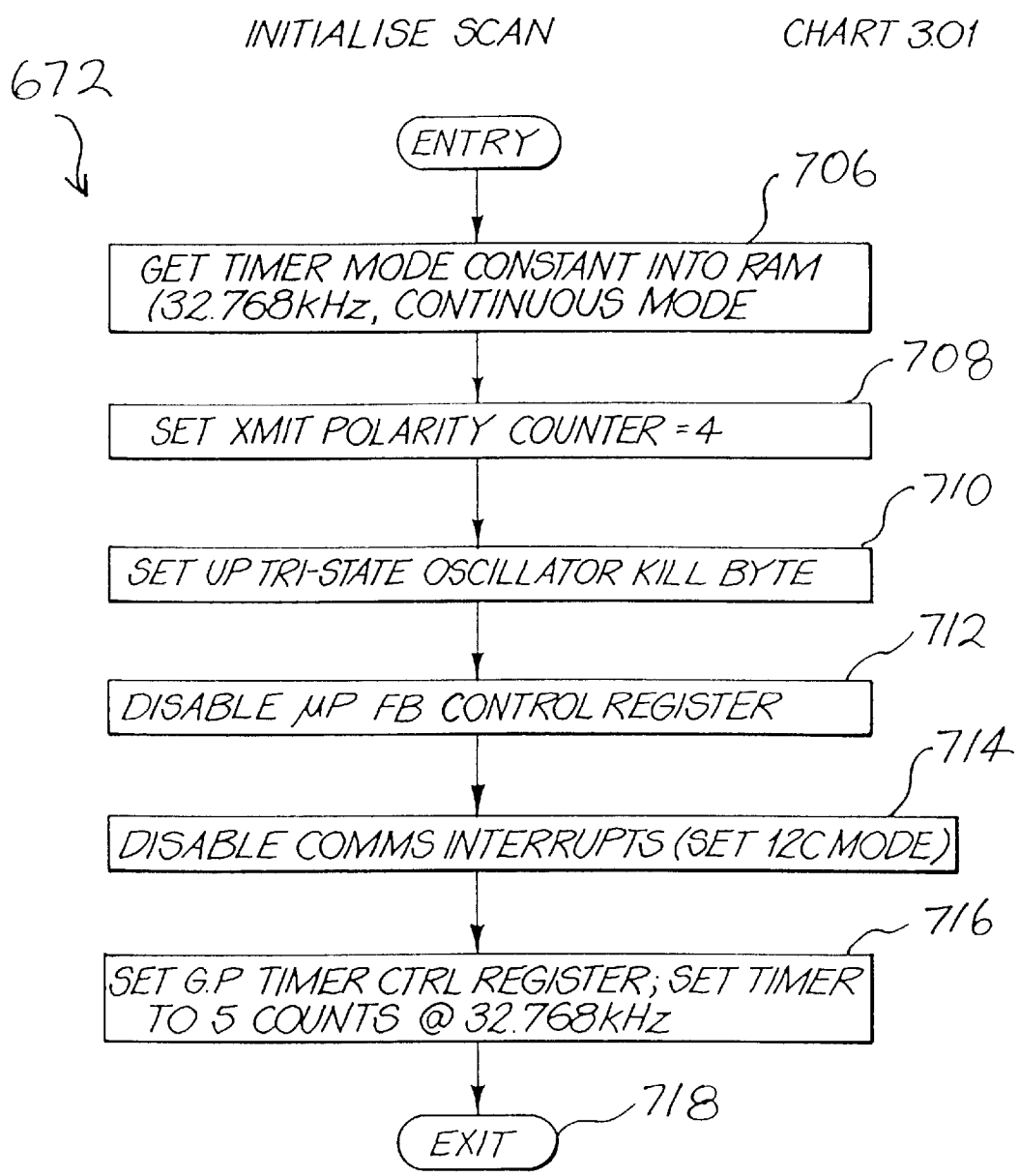

Referring now to FIG. 17, the subroutine "INITIALISE SCAN" 672 will be described.

In step 706, a timer mode constant is obtained so as to denote continuous mode.

Next at step 708, a value of 4 is written to TRANSMIT-.POLARITY.COUNTER.

Next in step 710 a tri-state OSCILLATOR.KILL byte is set up.

Next at step 712 the microprocessor FB.CONTROL register is disabled.

Next at step 714 the communications interrupts are disabled and the I²C mode is set.

Next in step 716 the GP.TIMER.CONTROL register is set to logic 1.

Further in step 716, GP.TIMER is written with a value of 5.

Next at step 718, subroutine 672 is exited.

Figure 18:
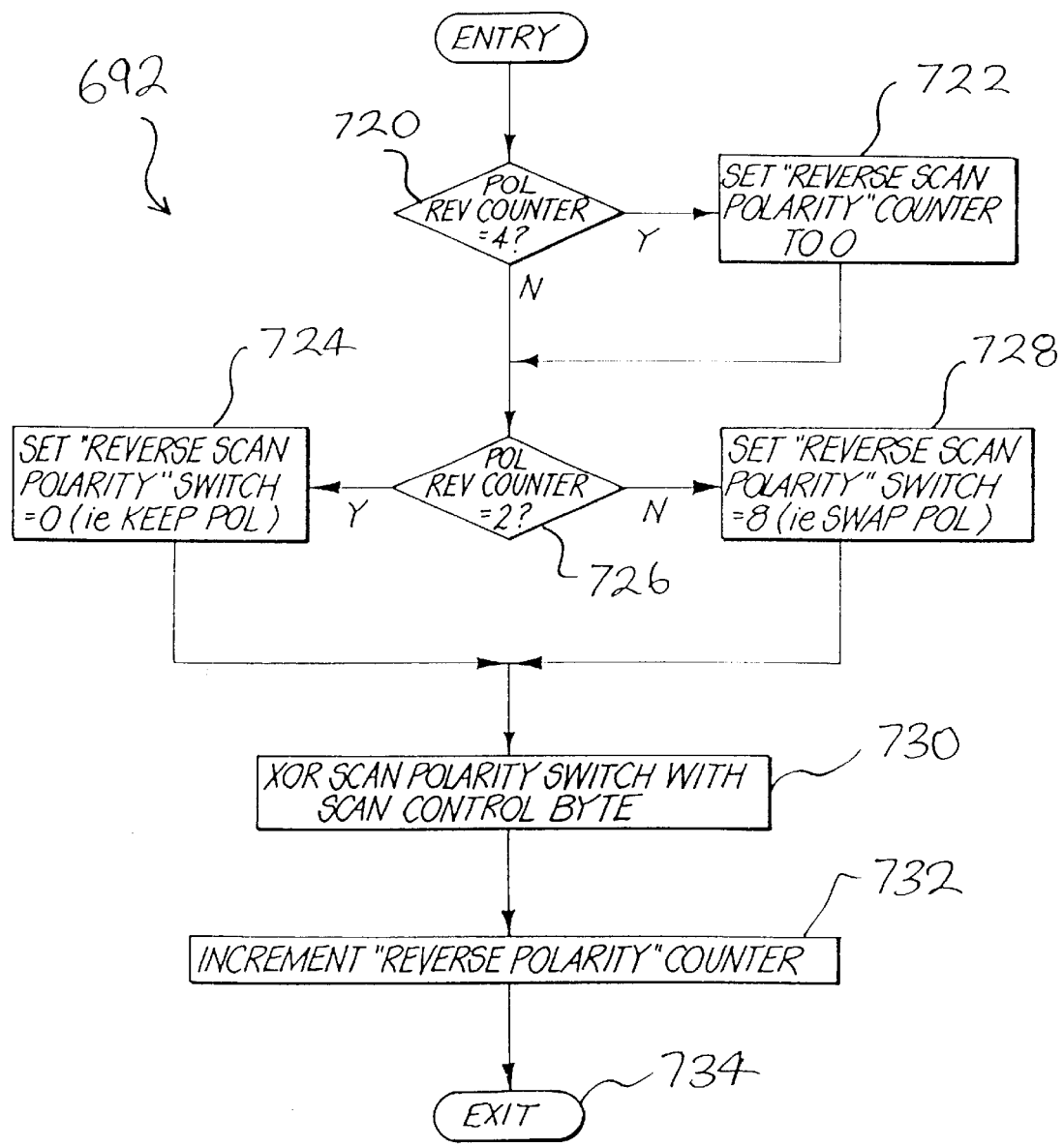

Referring to FIG. 18, the subroutine "POLARITY REVERSAL TASKS" 692 will be described.

Firstly at step 720, a value held in POL.REV.COUNT is read. If this value is not integer 4, then step 726 is proceeded to. Otherwise step 722 is proceeded to.

In step 722, a value of logic 0 is written to POL.REV-.COUNT.

Next in step 726, the value held in POL.REV.COUNT is again read. If the value is integer 2, then step 724 is proceeded to, otherwise step 728 is proceeded to.

In step 724, a logic 0 is written to REV.SCAN.POL.SWITCH, which provides for an existing polarity to remain.

In step 728, 8 or 1000 is written to REV.SCAN.POL.SWITCH, which provides for a reversal of polarity.

Next in step 730, an Exclusive-OR (XOR) operation is performed between the contents of REV.SCAN-.POL.SWITCH and SCAN.CONTROL.

Next in step 732 is the value of POL.REV.COUNT is incremented.

Finally step 734 is proceeded to and control is returned to the calling subroutine "MEASUREMENT RINGAROUND SEQUENCE".

Advantages of the Invention

The present invention particularly as implemented in the described embodiments offers a number of advantages over prior arrangements.

Firstly, the selection of a zero crossing using the signal amplitude is more reliable when used with an isolated single transmit because the relative peak heights of the received signal are not affected by acoustic signals left over from previous transmissions as can happen during a ring-around sequence.

Secondly, the analog electronics component of the gas meter 50 is simplified when an isolated single transmit pulse excitation is used. In particular, because this isolated single transmit pulse is always of the same polarity, only one amplitude threshold is required for detection and there is no need for rectification of the signal.

Also, the same arming delay can be used for both positive and negative received signals in the ring-around sequence. This is important since in the preferred embodiment every fourth received pulse is inverted with respect to the previous three received pulses.

The delay of comparators depends on how long they have been armed. The "armed and ready" time of a comparator using prior art amplitude arming can vary from about $0.4\tau$ to $0.75\tau$, where $\tau$ is the period of the received waveform. The delay timing arrangements of the present disclosure arm the zero crossing comparator at the same point within the received signal to within $\pm 0.03\tau$ and hence deliver much more repeatable times and provide for improved accuracy in detecting the acoustic wave packet and consequential measurement.

The amplitude comparator can be disabled during a ring-around to avoid interference from its own switching transients. The delay-time counter used to enable the zero crossing comparator can be electrically separated from the received signal so that interference from the delay timer can be made less than that from the amplitude comparator.

A further advantage is that the period of the received signal can be measured by measuring transit times to adjacent zero crossings, thus permitting the transit time of the signal to be accurately estimated.

Also, any zero crossing can be used, rather than the crossing that is easiest to detect. Zero crossings in the leading part of the wave packet consist principally of the plane wave and this is much less affected by temperature than other modes forming the latter part of the wave packet, hence there is less temperature effect.

Power consumption can be reduced because the delay counter can be used to power up the receive electronics just before the arrival of the received signal. The receiver can be turned off or it can be maintained in low power mode by reduction of its bandwidth for most of the ring-around sequence.

Additionally, the peak heights of the received signal can be measured using a variation of the technique of the present invention. The received signal amplitude threshold can then be tailored to the received waveform. The threshold is set to be a voltage between the voltage of two nominated peaks. Slow changes in the ultrasonic signal that might accompany ageing or damage to a transducer assembly can then be accommodated by changing the threshold.

It will be apparent from the foregoing that an improved method of detecting the arrival of an acoustic wave packet at a transducer has been disclosed. The transmission of a single wave packet is used to establish a timing window that can be used in a ring-around series of wave packets to arm the reception circuitry in a reliable and consistent manner so that the reception circuitry, for each packet of the series, responds to the same part of the received waveform. Such ensures that when a total propagation time for the series is calculated and averaged for fluid flow velocity determination, any errors in detection caused by reflection, acoustic modes and noise are substantially reduced.

The foregoing describes only a number of embodiments of the present invention and modifications, obvious to those skilled in the art can be made thereto without departing from the scope of the present invention.

What is claimed is:

1. A method of detecting the arrival at a transducer of an acoustic wave packet within a series of acoustic wave packets, said method comprising the steps of:
   (a) determining a nominal time of propagation of a single acoustic wave packet by:
      (i) simultaneosly starting a timer and transmitting said single acoustic wave packet to said transducer;
      (ii) receiving said single acoustic wave packet at said transducer; and
      (iii) receiving said single acoustic wave packet and stopping said timer to thereby determine said nominal time of propagation;
   (b) transmitting said series of acoustic wave packets to said transducer wherein the transmission of any one said wave packet within said series, excepting a first wave packet, is initiated upon detection of arrival at said transducer of an immediately preceding one of said wave packets in said series;
   (c) upon each transmission of said wave packet in step (b) starting a timer for determining a propagation time corresponding to said wave packet; and
   (d) determining when said timer is within a predetermined time of said nominal time of propagation to then enable identification at said transducer of said predetermined part of the corresponding wave packet to thereby detect the arrival of said corresponding wave packet.

2. A method according to claim 1, wherein said transmission of said wave packets in step (b) includes at least one of said wave packets being phase shifted with respect to a phase reference of said wave packet in step (a).

3. A method according to claim 2, wherein said predetermined parts are each one of a zero amplitude crossing occurring at a predetermined amplitude.

4. A method of detecting the arrival at a transducer of an acoustic wave packet within a series of acoustic wave packets, where the transmission of any one wave packet in said series, excepting a first wave packet, is initiated upon detection of arrival at said transducer of an immediately preceding wave packet in said series, and the detection comprises identifying a particular part of a waveform received at said transducer after arming a receiving arrangement that detection is imminent, characterised in that said method includes, prior to transmission of said series, transmitting a single acoustic wave packet to said transducer and determining a nominal propagation time of said single wave packet by identifying a corresponding particular part of a corresponding waveform received without arming said receiving arrangement, whereby said nominal propagation time is used to arm said receiving arrangement for the detection of each said wave packet within said series.

5. An electronic fluid meter comprising:
   a duct through which a fluid can flow;
   at least two acoustic transducers arranged within said duct to transmit acoustic energy therebetween, said transducers being separated by a predetermined distance defining a measurement portion;
   a control system for causing transmission and monitoring reception of acoustic wave packets between said transducers, said control system comprising:
      means for determining a nominal time of propagation of a single acoustic wave packet, said determining means comprising:
         (i) first transmitting means for simultaneously starting a timer and transmitting said single acoustic wave packet to one said transducer;
         (ii) means for receiving said single acoustic wave packet at said one transducer; and
         (iii) means for identifying a predetermined part of said wave packet and stopping said timer to thereby determine said nominal time of propagation;
      second transmitting means for transmitting a series of acoustic wave packets between said transducer, wherein the transmission of any one wave packet within said series, excepting a first wave packet, is initiated upon detection of arrival of an immediately preceding wave packet in said series;
      means for, upon each transmission of said wave packet, starting a timer for determining a propagation time corresponding to said wave packet; and
      means for determining when said timer is within a predetermined time of said nominal time of propagation to then enable identification of said predetermined part of the corresponding wave packet to thereby detect the arrival of said corresponding wave packet.

6. A meter according to claim 5, wherein said duct is cylindrical and comprises at least one fluid dynamically-shaped object arranged therein to control the propagation of acoustic modes forming part of said wave packets.

7. A meter according to claim 5, wherein said first and second transmitting means include a driver arrangement configured for coupling to said transducers, and a power supply arrangement, said power supply arrangement having charging means for charging an energy storage element prior to transmission and reception of said wave packets, wherein said charging means is disabled before said reception and said driver arrangement is powered by energy stored in said storage element.

8. A meter according to claim 7, wherein said charging means comprises a DC-to-DC converter and said storage element comprises a capacitor.

9. A meter according to claim 7, wherein said charging means is enabled during propagation of said acoustic wave packet.

10. A meter according to claim 7 wherein said driver arrangement comprises an output that provides at least one substantially square wave pulse including first and second amplitude values to excite one of said transducers to cause transmission of one said wave packet, and said driver arrangement comprising means for ramping said output between said amplitude values at a determinable time after exciting said transducer with said at least one pulse and before further excitation of said transducer to provide for a following wave packet to be inverted with respect to the immediately preceding wave packet.

11. A method of measuring a fluid flow parameter, said method comprising the steps of:

transmitting an ultrasonic test pulse from a first location within a fluid flow path, receiving said ultrasonic test pulse at a second location within the fluid flow path to determine a time delay value between a start of transmission of said test pulse and a zero amplitude crossing of said received ultrasonic test pulse, thereafter transmitting from said first location, a plurality of successive ultrasonic measurement pulses for reception at said second location, said reception being detected by crossing said zero amplitude after expiration of said time delay value, said transmission being started simultaneously with reception of the preceding ultrasonic measurement pulses.

12. A method as claimed in claim 11, wherein said time delay value is further determined by a reception of said ultrasonic test pulse exceeding a predetermined amplitude.

13. A method according to claim 12, wherein said fluid flow parameter is an average transit time being determined by dividing a total time of said time delay values by a total number of said values.

* * * * *